United States Patent
Ståhl et al.

(10) Patent No.: US 12,041,458 B2
(45) Date of Patent: Jul. 16, 2024

(54) PROFILE HANDLING OF A BATCH OF IDENTITY MODULES

(71) Applicant: Telefonaktiebolaget LM Ericsson (publ), Stockholm (SE)

(72) Inventors: Per Ståhl, Klagshamn (SE); Bernard Smeets, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 318 days.

(21) Appl. No.: 17/638,947

(22) PCT Filed: Sep. 10, 2019

(86) PCT No.: PCT/EP2019/074132
§ 371 (c)(1),
(2) Date: Feb. 28, 2022

(87) PCT Pub. No.: WO2021/047765
PCT Pub. Date: Mar. 18, 2021

(65) Prior Publication Data
US 2022/0295288 A1    Sep. 15, 2022

(51) Int. Cl.
*H04W 12/69*    (2021.01)
*H04W 4/50*    (2018.01)
*H04W 8/20*    (2009.01)
*H04W 12/04*    (2021.01)
*H04W 12/069*    (2021.01)

(52) U.S. Cl.
CPC ............ *H04W 12/69* (2021.01); *H04W 4/50* (2018.02); *H04W 8/205* (2013.01); *H04W 12/04* (2013.01); *H04W 12/069* (2021.01)

(58) Field of Classification Search
CPC ....... H04W 12/69; H04W 4/50; H04W 8/205; H04W 12/04; H04W 12/069; H04W 4/60; H04W 12/35; H04L 67/303
See application file for complete search history.

(56) References Cited

U.S. PATENT DOCUMENTS

2020/0252788 A1* 8/2020 Lou ....................... H04W 8/205

FOREIGN PATENT DOCUMENTS

| EP | 2986044 B1 | 6/2020 |
| WO | 2019136044 A1 | 7/2019 |
| WO | 2019137630 A1 | 7/2019 |

OTHER PUBLICATIONS

GSM Association, "RSP Technical Specification Version 2.2.1", Official Document SGP.22, Dec. 18, 2018, pp. 1-250.

* cited by examiner

*Primary Examiner* — Mazda Sabouri
(74) *Attorney, Agent, or Firm* — Sonoda & Kobayashi Intellectual Property Law; Sarvajit S. Patil

(57) ABSTRACT

There is provided mechanisms for profile handling of a batch of identity modules. Each identity module in the batch of identity modules has credentials for secure installation of profiles. A method is performed by an LPA of a proxy device. The LPA comprises credentials for profile download. The credentials comprise a certificate. The credentials enable the LPA to act as a virtual identity module. Another method is performed by a subscription management entity. Yet another method is performed by an identity module in the batch of identity modules.

20 Claims, 14 Drawing Sheets

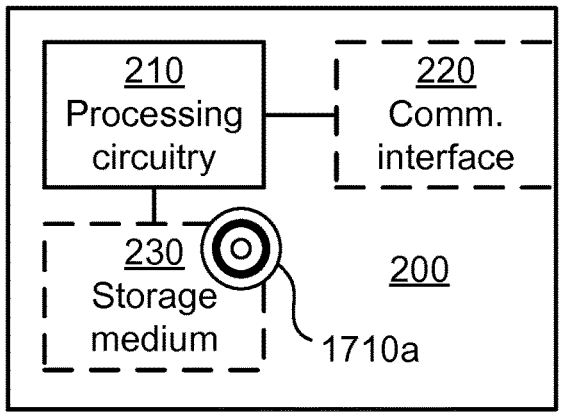
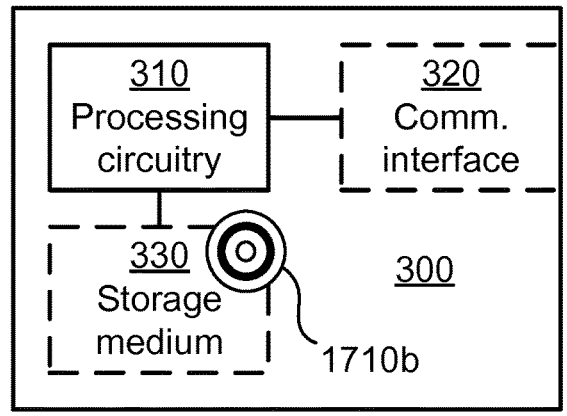
Fig. 11
Fig. 13
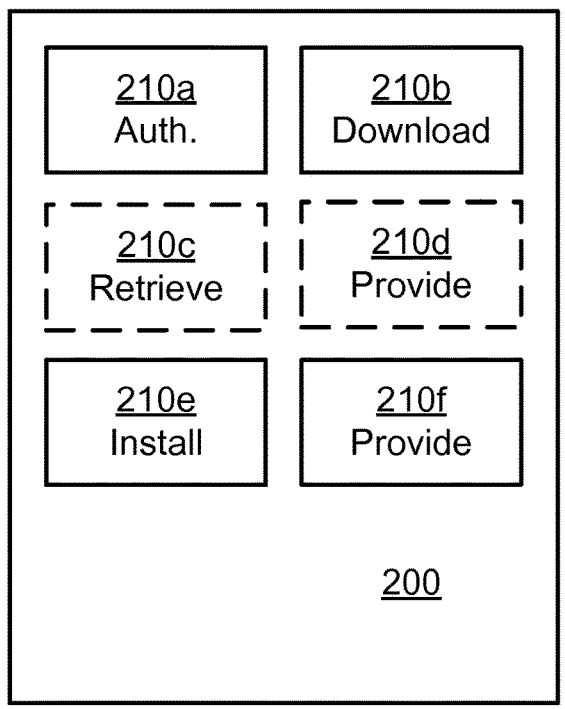
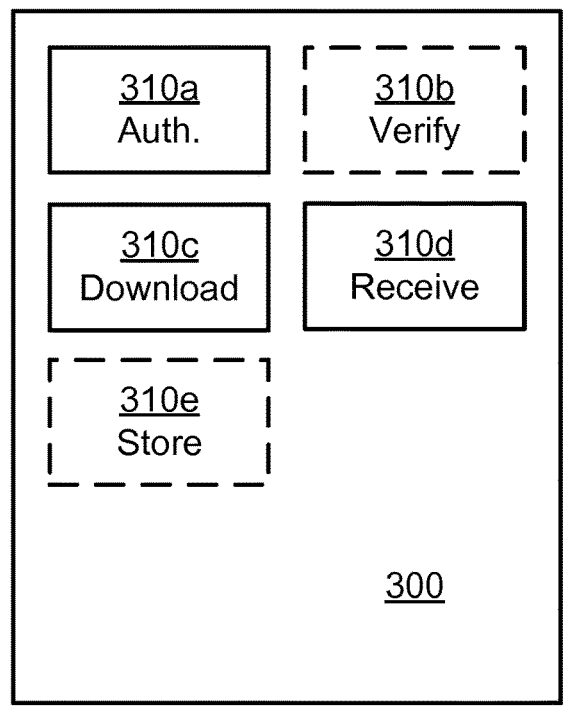
Fig. 12
Fig. 14

PROFILE HANDLING OF A BATCH OF IDENTITY MODULES

TECHNICAL FIELD

Embodiments presented herein relate to methods, a local profile assistant, a subscription management entity, an identity module, computer programs, and a computer program product for profile handling of a batch of identity modules.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is security. In general terms, proper security mechanisms are needed to prevent misuse of connected devices. As a non-limiting illustrative example, distributed denial of service (DDoS) attacks against popular websites might utilize poorly protected connected devices, such as cameras running the Internet Protocol (IP), routers, digital video recorders running the Internet Protocol, and so on.

Connected devices may also be entrusted with valuable, sensitive, or private data that needs to be protected from unauthorized access. Identity management is a central part of security and device life-cycle management. A connected device generally needs an identity to be able to identify and authenticate itself to its counterparts in the network in order to establish secure communication to other connected devices or services. This is needed at the connectivity layer when connecting to a network and at the application layer when connecting to a service of the network. Secure communication protects sensor data, or control data for actuators, but is also needed for provisioning of identities to the connected device and for secure configuration of the connected device, including secure firmware update. Identities are also the base for an access control mechanism controlling who can access resources of a connected device, including who can provision additional identities to the connected device.

A simplified block diagram of a communications network 100 is illustrated in FIG. 1. A connected device 190 is provided network access by a network node 110, such as a network gateway (GW) or an access point (AP) of a connectivity provider network 120. The connectivity provider network 120 further comprises an authentication server 130, which could be an authentication, authorization, and accounting (AAA) server. Subscriber information for connectivity may be stored in the authentication server 130 or may be stored in a separate network entity, which could be a home subscriber server (HSS) 140, and which separate network entity also provides authentication material for use by the authentication server 130. The connectivity provider network 120 in turn is operatively connected to a service network 150, such as the Internet, possibly comprising at least one second communications device 180 that could be a data server (DS). The service network 150 is further operatively connected to an enterprise network 160. The enterprise network 160 comprises a management server (MS) 170 and possibly at least one second communications device 180 that could be a DS.

As an example, the connected device 190 could belong to the enterprise of the enterprise network 160 and be configured to provide sensor data (or other type of data) to one or more of the second communications devices 180 located either in the enterprise network 160 or in the service network 150. The enterprise manages the connected device 120 through the management server 170. Management comprises providing identities and credentials to the connected device 190 and the second communications devices 180 to which the connected device 190 is communicating with such that secure communication can be established. The connectivity provider network 120 may, partly or fully, also be provided by the enterprise.

An overview of an architecture 500 for connectivity management in the GSMA consumer variant is shown in FIG. 2. The end-user 510 owning and/or using the connected device 190 may here order a new profile download from the MNO 520. The MNO 520 prepares a profile provisioning server, SM-DP+ 300 (short for enhanced Subscription Manager Data Preparation), for the profile download. An SM-DS 530 (short for Subscription Manager Discovery Server) stores events for an eUICC/iUICC 400 (short for enhanced universal integrated circuit card and integrated universal integrated circuit card, respectively). The eUICC/iUICC provide for a secured environment to store and utilize the credentials that come with the profile and are examples of realizations of such environments. The end-user 510 triggers the profile download (and switch of profile) via a Local Profile Assistant (LPAd) 200 available in the connected device 190 via a user interface. The LPAd 200 comprises a Local Discovery (LDSd) entity, a Local Profile Download (LPDd) entity, and a Local User Interface (LUId) entity. The suffix d indicates that the entity is part of the communications device 190. An eUICC/iUICC manufacturer (EUM) 550 is the entity that manufactured the eUICC/iUICC 400. The manufacturer of an iUICC is typically the device manufacturer. The Certificate Issuer (CI) 540 is the issuer of certificates used in profile download and other operations. Operational interfaces are shown as directional arrows connecting the entities 200-550. For example, ES9+ is the interface between SM-DP+ 300 and LPAd/LPDd 200 in the communications device 190, and ES10b is the interface between LPAd/LPDd 200 and the eUICC/iUICC 400, whereas ES8+ is the interface between SM-DP+ 300 and the eUICC/iUICC 400 in the communications device 190.

FIG. 3 is a signalling diagram of profile download to the connected device 190 using the architecture 500. For protection of the profile download secure communication is established between the eUICC/iUICC 400 and the SM-DP+ 300 as well between the LPAd 200 and the SM-DP+ 300. For protection of the profile download secure communication is established between the eUICC/iUICC 400 and the SM-DP+ 300 as well between the LPAd and the SM-DP+ 300. Most notably in FIG. 3 is the use of a session specific ephemeral key in the eUICC/iUCC to encrypt profile data. This implies that in the GSMA RSP consumer variant the protected profile (in the form of a Bound Profile Package (BPP)) to be send cannot be prepared before the download session has been initiated and is ongoing with the eUICC/iUICC.

The use of the GSMA consumer variant for constrained communication devices 190 poses problems in that many constrained communication devices 190 do not have a user interface for communication with the end-user or device owner and that there might not be any support for HTTPS. To mitigate these issues the LPA might be split up in two parts, where the major part, LPApr, is moved out from the communication device 190 to proxy device and where a minor part, LPAdv, is kept in the device for interaction with the eUICC/iUICC. This is illustrated in FIG. 4. FIG. 4 is a schematic illustration of an architecture 500' for connectivity management. In comparison to the architecture 500 in FIG. 2, the architecture 500' of FIG. 4 comprises a proxy device 560 and the functionality of the LPA (LPAd of FIG. 2) is split between the proxy device 560 (comprising the LPApr 200, where the suffix pr indicates the LPA part that is part of the proxy device 560) and the communications device 190' (comprising the LPAdv, where the suffix dv indicates the LPA part that is part of the communications device 190'). This has the benefits of creating an architecture for remote SIM provisioning with a small footprint in the communication device 190' leveraging protocols already there for device management.

The architecture of FIG. 4 may be used in a device or module manufacturing environment for downloading and installing profiles into the eUICCs/iUICCs. Lack of network connection to the Internet might prevent online interaction between the SM-DP+ 300 and the eUICC/iUICC 400. Such online interaction might for the above disclosed methods be required for successful profile download and installation. Furthermore, separate profile download and profile installation is still required for each communication device, which might be cumbersome and turn out to be a bottleneck when profile handling of large amounts of communication devices or modules is needed.

Hence, there is still a need for an improved profile handling, such as download and installation of profiles to communication devices.

SUMMARY

An object of embodiments herein is to provide efficient profile handling for communication devices.

According to a first aspect there is presented a method for profile handling of a batch of identity modules. Each identity module in the batch of identity modules has credentials for secure installation of profiles. The method is performed by an LPA of a proxy device. The LPA comprises credentials for profile download. The credentials comprise a certificate. The credentials enable the LPA to act as a virtual identity module. The method comprises authenticating with a subscription management entity for group download of profiles for a batch of identity modules of respective communication devices to the LPA upon providing, in a GSMA RSP AuthenticateClient command sent to the subscription management entity, the certificate of the virtual identity module and signed data. The data is signed using the credentials of the virtual identity module. The certificate and signed data are by the LPA used to authenticate itself to the subscription management entity on behalf of the batch of identity modules, and to identify the profiles for the batch of identity modules at the subscription management entity. The method comprises downloading, from the subscription management entity as a response to the GSMA RSP GetBoundProfilePackage command, profiles for the batch of identity modules. Each profile is protected by the subscription management entity, and thus defines a protected profile, such that it can be decrypted and verified by one of the identity modules in the batch of identity modules using its credentials for secure installation of protected profiles, but where the virtual identity module is without credentials for fully decrypting any of the protected profiles. The method comprises installing a respective one of the protected profiles to each of the identity modules in the batch of identity modules. The method comprises providing for each of the profiles, in a GSMA RSP HandleNotification command sent to the subscription management entity, a GSMA RSP ProfileInstallationResult with the result of the profile installation for the respective identity module.

According to a second aspect there is presented an LPA of a proxy device for profile handling of a batch of identity modules. Each identity module in the batch of identity modules has credentials for secure installation of profiles. The LPA comprises credentials for profile download. The credentials comprise a certificate. The credentials enable the LPA to act as a virtual identity module. The LPA further comprises processing circuitry. The processing circuitry is configured to cause the LPA to authenticate with a subscription management entity for group download of profiles for a batch of identity modules of respective communication devices to the LPA upon providing, in a GSMA RSP AuthenticateClient command sent to the subscription management entity, the certificate of the virtual identity module and signed data. The data is signed using the credentials of the virtual identity module. The certificate and signed data are by the LPA used to authenticate itself to the subscription management entity on behalf of the batch of identity modules, and to identify the profiles for the batch of identity modules at the subscription management entity. The processing circuitry is configured to cause the LPA to download, from the subscription management entity as a response to the GSMA RSP GetBoundProfilePackage command, profiles for the batch of identity modules. Each profile is protected by the subscription management entity, and thus defines a protected profile, such that it can be decrypted and verified by one of the identity modules in the batch of identity modules using its credentials for secure installation of protected profiles, but where the virtual identity module is without credentials for fully decrypting any of the protected profiles. The processing circuitry is configured to cause the LPA to install a respective one of the protected profiles to each of the identity modules in the batch of identity modules. The processing circuitry is configured to cause the LPA to provide for each of the profiles, in a GSMA RSP HandleNotification command sent to the subscription management entity, a GSMA RSP ProfileInstallationResult with the result of the profile installation for the respective identity module.

According to a third aspect there is presented a computer program for profile handling of a batch of identity modules. The computer program comprises computer program code which, when run on processing circuitry of an LPA, causes the LPA to perform a method according to the first aspect.

According to a fourth aspect there is presented a method for profile handling of a batch of identity modules. Each identity module in the batch of identity modules has credentials for secure installation of profiles. The method is performed by a subscription management entity. The method comprises authenticating an LPA of a proxy device for group download of profiles for a batch of identity modules of respective communication devices to the LPA upon obtaining, in a GSMA RSP AuthenticateClient command sent from the LPA, a certificate and signed data for download of the profiles, the subscription management entity based on the certificate and signed data for download of the profiles authenticates the LPA on behalf of the batch of identity modules and identifies profiles for the batch of identity modules. The method comprises downloading, to the LPA and as a response to the GSMA RSP GetBoundProfilePackage command, the profiles for the batch of identity modules. Each profile is protected, by the subscription management entity, and thus defines a protected profile such that it can be decrypted and verified by one of the identity modules in the batch of identity modules using its credentials for secure installation of profiles but where the LPA is without credentials for fully decrypting any of the protected profiles. The method comprises receiving, from the LPA and for each of the protected profiles, in a GSMA RSP HandleNotification command, a GSMA RSP ProfileInstallationResult with the result of the profile installation for the respective identity module.

According to a fifth aspect there is presented a subscription management entity for profile handling of a batch of identity modules. Each identity module in the batch of identity modules has credentials for secure installation of profiles. The subscription management entity comprises processing circuitry. The processing circuitry is configured to cause the subscription management entity to authenticate an LPA of a proxy device for group download of profiles for a batch of identity modules of respective communication devices to the LPA upon obtaining, in a GSMA RSP AuthenticateClient command sent from the LPA, a certificate and signed data for download of the profiles, the subscription management entity based on the certificate and signed data for download of the profiles authenticates the LPA on behalf of the batch of identity modules and identifies profiles for the batch of identity modules. The processing circuitry is configured to cause the subscription management entity to download, to the LPA and as a response to the GSMA RSP GetBoundProfilePackage command, the profiles for the batch of identity modules. Each profile is protected, by the subscription management entity, and thus defines a protected profile such that it can be decrypted and verified by one of the identity modules in the batch of identity modules using its credentials for secure installation of profiles but where the LPA is without credentials for fully decrypting any of the protected profiles. The processing circuitry is configured to cause the subscription management entity to receive, from the LPA and for each of the protected profiles, in a GSMA RSP HandleNotification command, a GSMA RSP ProfileInstallationResult with the result of the profile installation for the respective identity module.

According to a sixth aspect there is presented a computer program for profile handling of a batch of identity modules. The computer program comprises computer program code which, when run on processing circuitry of a subscription management entity, causes the subscription management entity to perform a method according to the fourth aspect.

According to a seventh aspect there is presented a method for profile handling of an identity module of a communication device. The identity module has credentials for secure installation of a profile. The method is performed by the identity module. The method comprises installing the profile by obtaining a GSMA RSP BoundProfilePackage (BPP) formatted protected profile from an LPA of a proxy device. The protected profile comprises an identifier identifying the identity module or a group of identity modules of which the identity module is part. That the protected profile is intended for the identity module is verified by the identity module matching the identifier of the profile. The profile is decrypted using the credentials for secure installation of the profile. The method comprises providing profile installation result information of the installing to the LPA.

According to an eight aspect there is presented an identity module for profile handling of the identity module of a communication device. The identity module has credentials for secure installation of a profile. The identity module comprises processing circuitry. The processing circuitry is configured to cause the identity module to install the profile by obtaining a GSMA RSP BPP formatted protected profile from an LPA of a proxy device. The protected profile comprises an identifier identifying the identity module or a group of identity modules of which the identity module is part. That the protected profile is intended for the identity module is verified by the identity module matching the identifier of the profile. The profile is decrypted using the credentials for secure installation of the profile. The processing circuitry is configured to cause the identity module to provide profile installation result information of the installing to the LPA.

According to a tenth aspect there is presented a computer program for profile handling of an identity module of a communication device, the computer program comprising computer program code which, when run on processing circuitry of an identity module, causes the identity module to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously these methods, these LPAs, these subscription management entities, these identity modules, and these computer programs provide efficient profile handling for communication devices.

Advantageously these methods, these LPAs, these subscription management entities, these identity modules, and these computer programs are suitable for profile handling of large amounts of communication devices.

Advantageously these methods, these LPAs, these subscription management entities, these identity modules, and these computer programs are suitable for profile handling when online interaction between the subscription management entity and the identity module is prevented.

Advantageously these methods, these LPAs, these subscription management entities, these identity modules, and these computer programs allow the GSMA RSP consumer variant adapted for the architecture of FIG. 4 to be used in environments where profile download and profile installation are performed at separate instances and where it is desirable to handle profile download for a whole batch of identity modules at a time. This might be beneficial in manufacturing environments without Internet connectivity and/or where online interaction for profile download may be too time consuming for the factory flow.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 11 is a schematic diagram showing functional units of an LPA according to an embodiment;

FIG. 12 is a schematic diagram showing functional modules of an LPA according to an embodiment;

FIG. 13 is a schematic diagram showing functional units of a subscription management entity according to an embodiment;

FIG. 14 is a schematic diagram showing functional modules of a subscription management entity according to an embodiment;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is still a need for an improved profile handling, such as download and installation of profiles to communication devices.

Assume that a batch of communication devices 190' is owned by an enterprise network 160 where each communication devices 190' contains an iUICC/eUICC or similar type of identity module 400. The communication devices 190' are to be provisioned with new cellular subscription profiles from an MNO 520 selected by the enterprise network 160 to provide connectivity for its communication devices 190'. The profile download and profile installation are performed at separate instances. An LPA 200 drives the profile download, where the LPA 200 is an entity assumed to be located outside of the communication devices 190'. This LPA 200 might perform the functionality of an LPApr or a Loader Application (LA). The LPA 200 is also triggered to perform profile installation and profile management.

The embodiments disclosed herein in particular relate to mechanisms for profile handling of a batch of identity modules. In order to obtain such mechanisms there is provided an LPA 200, a method performed by the LPA 200, a computer program product comprising code, for example in the form of a computer program, that when run on processing circuitry of the LPA 200, causes the LPA 200 to perform the method. In order to obtain such mechanisms there is further provided a subscription management entity 300, a method performed by the subscription management entity 300, and a computer program product comprising code, for example in the form of a computer program, that when run on processing circuitry of the subscription management entity 300, causes the subscription management entity 300 to perform the method. In order to obtain such mechanisms there is further provided an identity module 400, a method performed by the identity module 400, and a computer program product comprising code, for example in the form of a computer program, that when run on processing circuitry of the identity module 400, causes the identity module 400 to perform the method.

Figure 5:
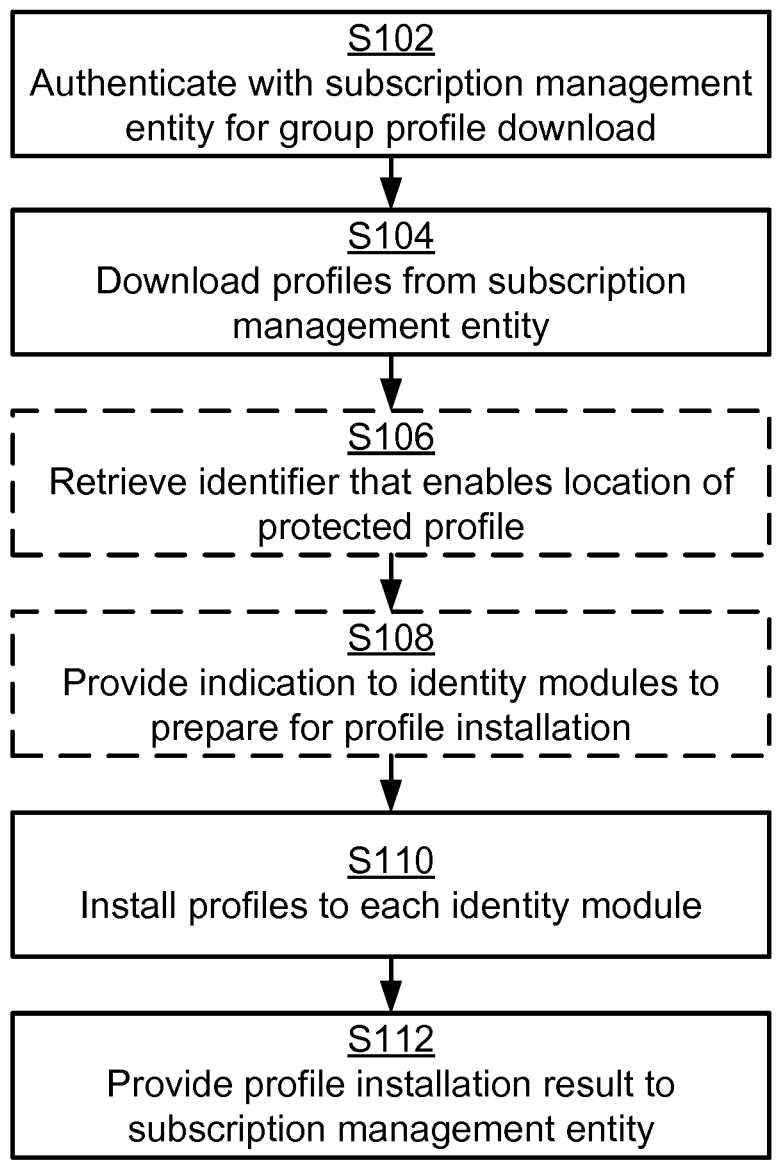
FIGS. 5, 6, and 7 are flowcharts of methods according to embodiments.

Reference is now made to FIG. 5 illustrating a method for profile handling of a batch of identity modules as performed by the LPA 200 of the proxy device 560 according to an embodiment. Each identity module 400 in the batch of identity modules has credentials for secure installation of profiles. The LPA comprises credentials for profile download. The credentials comprise a certificate. The credentials enable the LPA 200 to act as a virtual identity module.

S102: The LPA 200 authenticates with a subscription management entity 300 for group download of profiles for a batch of identity modules of respective communication devices 190' to the LPA 200 upon providing, in a GSMA Remote SIM Provisioning, RSP, AuthenticateClient command sent to the subscription management entity 300, the certificate of the virtual identity module and signed data. The data is signed using the credentials of the virtual identity module. The certificate and signed data are by the LPA 200 used to authenticate itself to the subscription management entity 300 on behalf of the batch of identity modules, and to identify the profiles for the batch of identity modules at the subscription management entity.

S104: The LPA 200 downloads, from the subscription management entity 300 as a response to the GSMA RSP GetBoundProfilePackage command, profiles for the batch of identity modules. Each profile is protected by the subscription management entity 300, and thus defines a protected profile, such that it can be decrypted and verified by one of the identity modules in the batch of identity modules using its credentials for secure installation of protected profiles, but where the virtual identity module is without credentials for fully decrypting any of the protected profiles.

S110: The LPA 200 installs a respective one of the protected profiles to each of the identity modules 400 in the batch of identity modules.

S112: The LPA 200 provides for each of the profiles, in a GSMA RSP HandleNotification command sent to the subscription management entity 300, a GSMA RSP ProfileInstallationResult with the result of the profile installation for the respective identity module.

Embodiments relating to further details of profile handling of a batch of identity modules as performed by the LPA 200 will now be disclosed.

In some embodiments, an identifier from the identity module is used to locate correct protected profile to be downloaded to the correct identity module. Hence, according to some embodiments, the LPA 200 is configured to perform (optional) step S106:

S106: The LPA 200 retrieves from each communication device 190' an identifier that enables the LPA 200 to locate which protected profile to be installed into each identity module.

In some embodiments, the credentials of the virtual identity module comprise a private key. The private key is used to sign the signed data of the AuthenticateClient command. The certificate of the virtual identity module comprises a virtual identity module identifier. The profiles are identified at the subscription management entity 300 either based on the virtual identity module identifier or a matching identifier that is part of the signed data.

In some embodiments, the identity modules are notified to prepare for profile installation. In particular, according to some embodiments, the LPA 200 is configured to perform (optional) step S108:

S108: The LPA 200 provides an indication to each identity module 400 to prepare for profile installation. The indication comprises an address of the subscription management entity 300 and a certificate of the subscription management entity 300.

In some embodiments, a common profile download procedure and common profile installation procedure are performed for all identity modules 400. That is, in some embodiments, one single occurrence of the authenticating and one single occurrence of the downloading are performed for all the profiles.

In some embodiments, there is one profile download procedure and one profile installation flow per identity module 400. That is, in some embodiments, one respective occurrence of the authenticating and one respective occurrence of the downloading are performed for each of the profiles.

In some embodiments, the certificate of the virtual identity module is a certificate for group download and the GSMA RSP AuthenticateClient command indicates group profile download. The credentials for secure installation of profiles of each identity module 400 in the batch of identity module comprises an identity module private key and an identity module certificate. Downloading profiles from the subscription management entity 300 for the batch of identity modules then follows upon the certificate of each identity module in the batch of identity modules being provided to the subscription management entity 300. The certificates are provided to the subscription management entity 300 in a GSMA RSP GetBoundProfilePackage command.

In some embodiments, the identifier of each identity module is the EID of that identity module and the EID is part of the certificate of that identity module. Which protected profile to be installed into which identity module is then based on order of occurrence of the identity module certificates in the GSMA RSP GetBoundProfilePackage command being the same as order of occurrence of downloaded protected profiles listed in the response to the GSMA RSP GetBoundProfilePackage command.

In some embodiments, the identifier of each identity module is the EID of that identity module and the EID is part of the certificate of that identity module. The protected profile for each identity module then contains the EID, enabling the LPA 200 to locate which protected profile to be installed into which identity module.

In some embodiments, the protected profile is a GSMA RSP formatted BPP.

In some embodiments, the BPP is encrypted using the public key of a respective identity module at a first encryption layer and an ephemeral public key of the virtual identity module at a second encryption layer. This might be an elliptic curve (EC) public key but other cryptographic public key cryptographic systems could be used as well. The second encryption layer is verified and decrypted by the virtual identity module using a corresponding ephemeral EC private key. The actual encryption might be performed using a randomly chosen symmetric key and then this key is encrypted by, or derived, from the public key of the identity module. The same holds also for the public key of the virtual identity module.

In some embodiments, the GSMA RSP ProfileInstallationResult for each protected profile is created by the virtual identity module, using the credentials of the virtual identity module, based on a result of the protected profile installation obtained from the identity modules.

In some embodiments, the GSMA RSP ProfileInstallationResult for each protected profile is obtained from the respective identity module 400.

Figure 6:
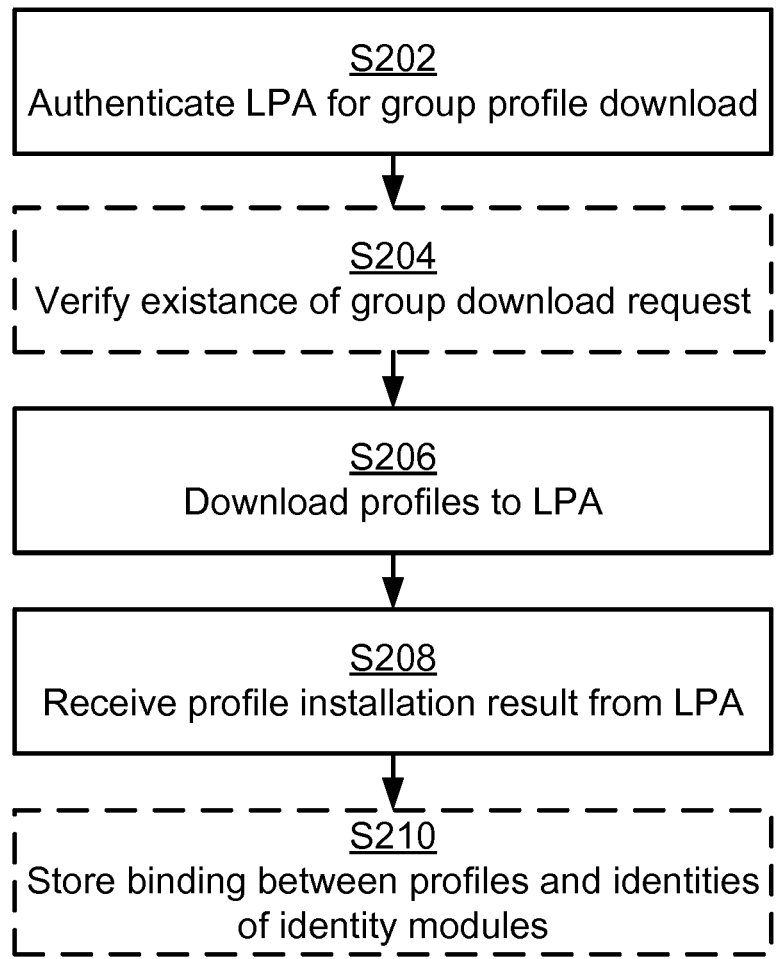

Reference is now made to FIG. 6 illustrating a method for profile handling of a batch of identity modules as performed by the subscription management entity 300 according to an embodiment. Each identity module 400 in the batch of identity modules has credentials for secure installation of profiles.

S202: The subscription management entity 300 authenticates an LPA 200 of a proxy device 560 for group download of profiles for a batch of identity modules of respective communication devices 190' to the LPA 200 upon obtaining, in a GSMA RSP AuthenticateClient command sent from the LPA 200, a certificate and signed data for download of the profiles. The subscription management entity 300 based on the certificate and signed data for download of the profiles authenticates the LPA 200 on behalf of the batch of identity modules and identifies profiles for the batch of identity modules.

S206: The subscription management entity 300 downloads, to the LPA 200 and as a response to the GSMA RSP GetBoundProfilePackage command, the profiles for the batch of identity modules. In this respect, the term download might here be construed as the subscription management entity 300 facilitating download of the profiles for the batch of identity modules to the LPA 200. Each profile is protected, by the subscription management entity 300, and thus defines a protected profile such that it can be decrypted and verified by one of the identity modules in the batch of identity modules using its credentials for secure installation of profiles but where the LPA is without credentials for fully decrypting any of the protected profiles.

S208: The subscription management entity 300 receives, from the LPA and for each of the protected profiles, in a GSMA RSP HandleNotification command, a GSMA RSP ProfileInstallationResult with the result of the profile installation for the respective identity module.

Embodiments relating to further details of profile handling of a batch of identity modules as performed by the subscription management entity 300 will now be disclosed.

As noted above, in some embodiments, one single occurrence of the authenticating and one single occurrence of the downloading are performed for all the profiles.

In some embodiments, the GSMA RSP AuthenticateClient command indicates group profile download, and the subscription management entity 300 is configured to perform (optional) step S204:

S204: The subscription management entity 300 verifies that the certificate is certified for group profile download and that there exists a prepared group profile download matching an identity module identifier obtained from the certificate or a matching identifier obtained from the signed data.

In some embodiments, each of the credentials for secure installation of profiles of each identity module 400 in the batch of identity modules comprises an identity module private key and an identity module certificate. Wherein downloading profiles to the LPA 200 for the batch of identity modules then follows upon the certificate of each identity module in the batch of identity modules being received from the LPA. The certificates are received from the LPA 200 in the GSMA RSP GetBoundProfilePackage command.

As noted above, in some embodiments, each of the protected profiles is a GSMA RSP formatted BPP. Each BPP is protected using a permanent EC public key of its identity module as given by the respective certificate of the identity modules 400.

In some embodiments, the GSMA Remote SIM Provisioning session keys as used to protect individual parts of each BPP are derived from a shared key that is computed using the private key of the subscription management entity 300. For example, this can be via an Elliptic Curve Diffie-Hellman (ECDH) shared secret that is computed using a private key of an ephemeral EC key pair of the subscription management entity 300 generated for each BPP and the permanent EC public key of the respective identity module. A transaction identifier of each BPP then acts as EID of the identity modules.

In some embodiments, the protected profile is first protected using the permanent EC public key of the respective identity module. The thus resulting protected profile is used as input when generating the corresponding BPP such that the protected profile is encrypted twice. GSMA RSP session keys as used to protect individual parts of each BPP are derived from an ECDH shared secret that is computed using a private key of an ephemeral EC key pair of the subscription management entity 300 generated for each BPP and an ephemeral EC public key of a virtual identity module of the LPA 200.

In some embodiments, each of the protected profiles is protected using a group key common for all profiles.

As noted above, in some embodiments, one respective occurrence of the authenticating and one respective occurrence of the downloading are performed for each of the profiles.

In some embodiments, the subscription management entity 300 is configured to perform (optional) step S210:

S210: The subscription management entity 300 stores a binding between each profile and an identity of each identity module. Each binding is obtained from the ProfileInstallationResult following successful verification.

Figure 7:
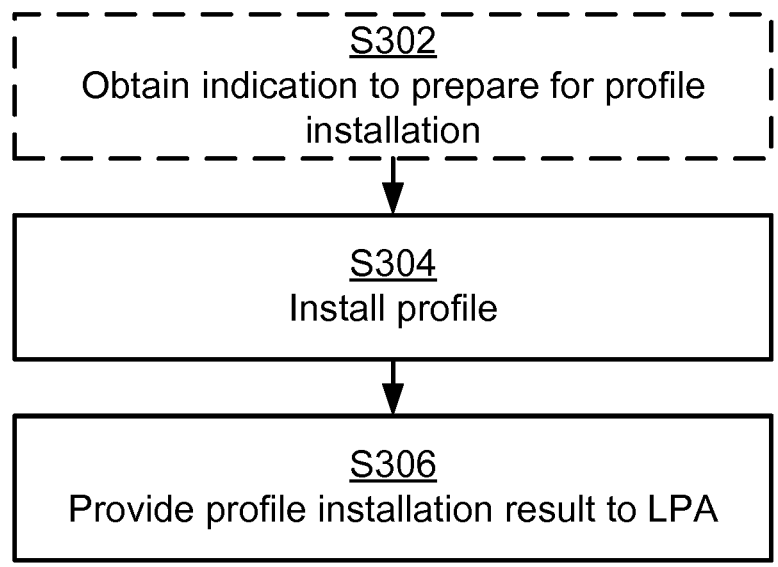

Reference is now made to FIG. 7 illustrating a method for profile handling of an identity module 400 of a communication device 190' as performed by the identity module 400 according to an embodiment. The identity module 400 has credentials for secure installation of a profile S304: The identity module 400 installs the profile by obtaining a GSMA RSP BPP formatted protected profile from an LPA 200 of a proxy device 560. The protected profile comprises an identifier identifying the identity module or a group of identity modules of which the identity module is part. That the protected profile is intended for the identity module is verified by the identity module matching the identifier of the profile. The profile is decrypted using the credentials for secure installation of the profile.

S306: The identity module 400 provides profile installation result information of the installing to the LPA 200.

Embodiments relating to further details of profile handling of an identity module 400 of a communication device 190' as performed by the identity module 400 will now be disclosed.

In some embodiments, the transaction identifier is the identifier identifying the identity module. In other embodiments, the transaction identifier is set to a group identifier provided to the MNO or the subscription management entity when ordering the profiles. This identifier is then also set during manufacturing together with the group key into each identity module.

In some embodiments, the identifier of the BPP is the EID of the identity module. The credentials for secure installation of the BPP comprises a permanent EC private key and a corresponding EC public key contained in an identity module certificate. The received BPP has been encrypted using the permanent EC public key. The BPP is decrypted by the identity module using the permanent EC private key.

In some embodiments, the GSMA RSP session keys used to protect the individual parts of the BPP are derived from an Elliptic Curve Diffie-Hellman (ECDH) shared secret that is computed using the permanent EC private key contained in the identity module 400 and an EC public key of an ephemeral EC key pair of the subscription management entity 300. The EC public key of the ephemeral EC key pair of the subscription management entity 300 is then included as part of the BPP.

In some embodiments, the identity module 400 is configured to perform (optional) step S302:

S302: The identity module 400 obtains an indication from the LPA 200 to prepare for profile installation. The indication comprises an address of the subscription management entity 300 and a certificate of the subscription management entity 300. The protected profile is decrypted using parameters extracted based on the indication.

In some embodiments, the protected profile is protected by a group key common for all profiles of a batch of identity modules. The credentials for secure installation of the protected profile comprises the group key. The identifier of the BPP is an identifier for the group key.

In some embodiments, the proxy device 560 is a part of a management server device.

In some embodiments, the communication device 190' is a constrained device, such as an IoT device.

One particular embodiment for profile handling of a batch of identity modules, in particular relating to profile download for a batch of identity modules, based on at least some of the above disclosed embodiments will now be disclosed in detail.

During the profile download the LPA has the role of both a standard GSMA RSP LPAd and the identity module of the communication device 190' by acting as a virtual identity module. The LPA is equipped with an EC private-public key pair and a certificate certifying the public key.

The certificate is similar to an identity module certificate with the difference that it indicates that the certificate owner is certified for group profile download. The LPA certificate is issued by an EUM that in turn is certified by a Certificate Issuer (CI) in the same way as an identity module is certified in the GSMA PKI model. For the sake of disclosure, it is assumed that the private-public key pair and the certificate are present in the LPA. In practice the LPA may receive this data as result of a personalization step during device manufacturing and the private key might be secured by similar techniques as for the identity module.

Figure 8:
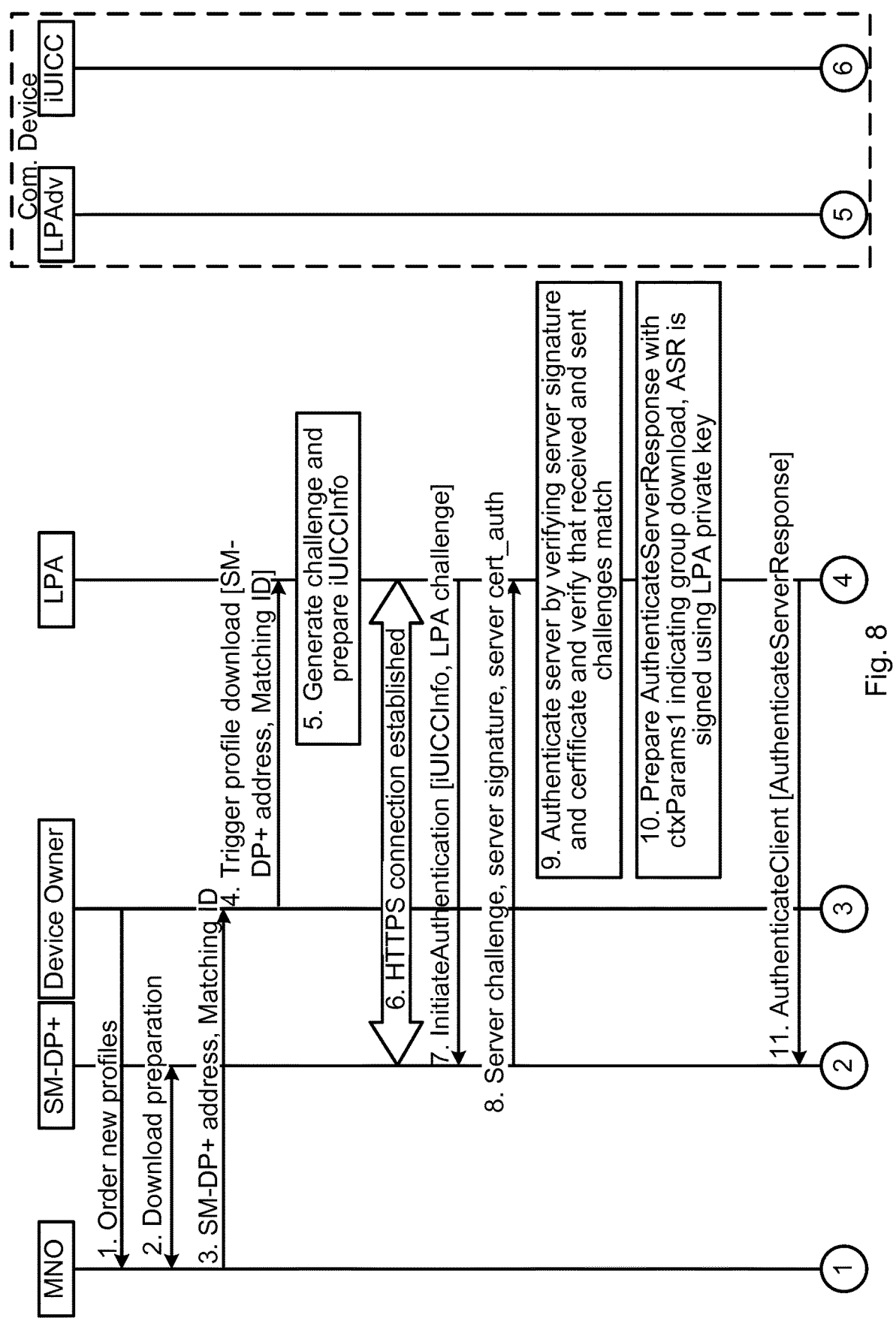
FIGS. 8, 9, and 10 are signalling diagrams according to embodiments.
Figure 8:
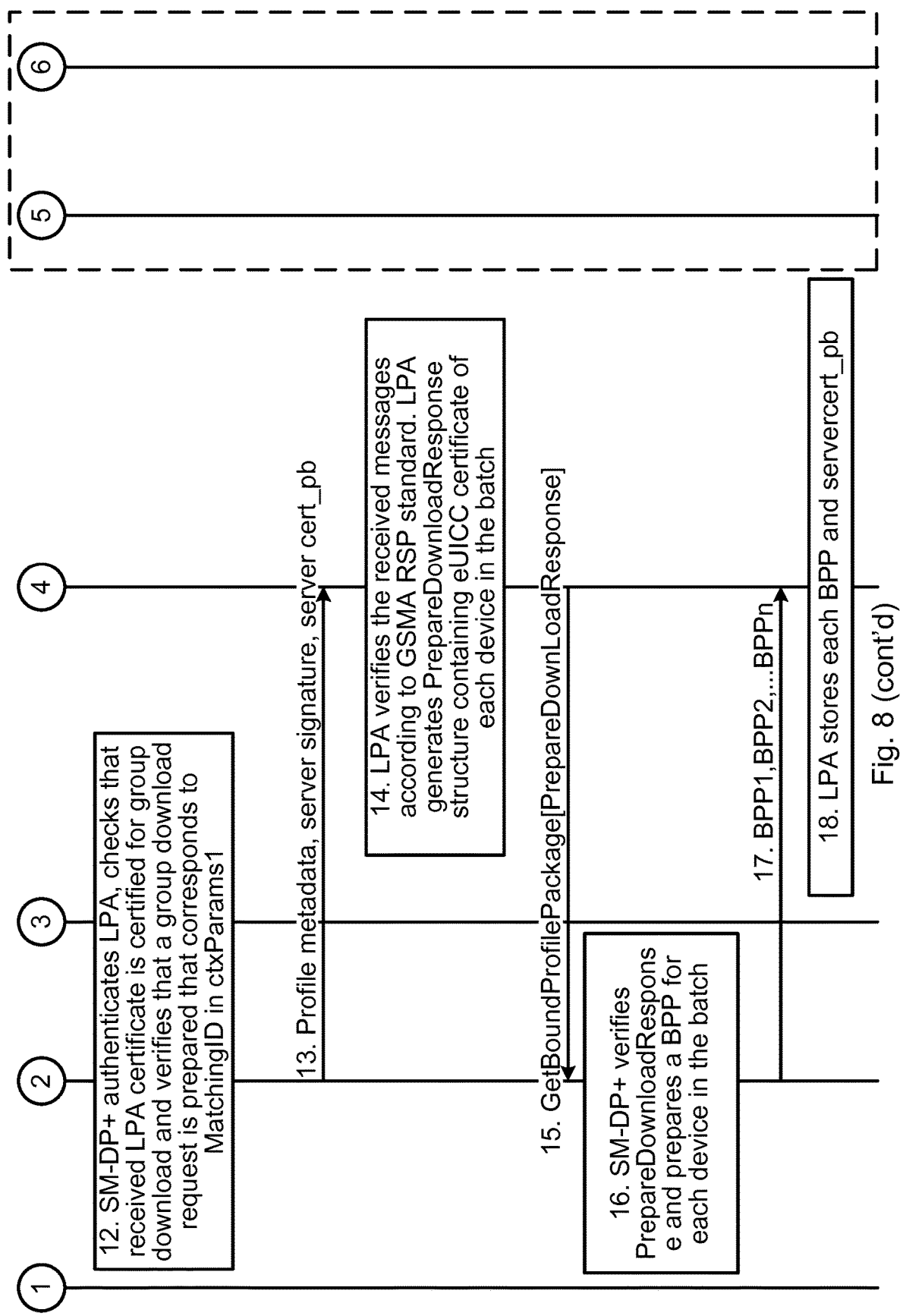

The interactions between the LPA and the subscription management entity for profile download for a batch of identity modules is supposed to be as similar as possible as the interactions between the LPAd/identity module and the subscription management entity in the standard GSMA RSP profile download flow for one identity module. Reference is made to the signalling diagram of FIG. 8 for profile handling of a batch of identity modules, in particular relating to profile download for a batch of identity modules.

1. The device owner (as represented by the enterprise network 160) orders new profiles for the batch of identity modules. The enterprise network 160 indicates that group download will be performed.

2. The MNO 520 and the subscription management entity 300 prepare subscription profiles for the batch of identity modules following standard procedures.

3. The device owner receives an activation code (AC) containing the subscription management entity address and a Matching ID identifying the profile download task.

4. The device owner configures the LPA with the activation code and triggers profile download.

5. The LPA generates a challenge and prepares an iUIC-CInfo1 structure. This is in contrast to common procedures where this structure is performed by the identity module.

6. The LPA establishes a HTTPS connection with the subscription management entity following the GSMA RSP standard.

7. The LPA initiates mutual authentication with the subscription management entity by sending a standard Initiate-Authentication command to subscription management entity, providing the LPA challenge and iUICCInfo1 to the subscription management entity.

8. The subscription management entity acts according to the GSMA RSP standard and responds with serverSigned1 (containing LPA challenge, server challenge, etc.), server-Signature1 on serverSigned1 data, and subscription management entity certificate for authentication.

9. The LPA authenticates the subscription management entity by performing verification. This is in contrast to common procedures where this verification is performed by the LPAd and the identity module according to the GSMA RSP standard.

10. If successful authentication, the LPA prepares an AuthenticateServerResponse (ASR) with ctxParams1 indicating that the operation to be performed is a group profile download. The ASR is signed using the LPA private key (in contrast to the identity module private key used according to the GSMA RSP standard). The LPA certificate (in contrast to the identity module certificate used according to the GSMA RSP standard) indicates that the LPA is certified for group profile download.

11. The LPA sends the AuthenticateClient command containing the AuthenticateServerResponse structure to the subscription management entity.

12. The subscription management entity authenticates the LPA following the GSMA RSP standard. When the subscription management entity discovers that the operation to be performed is a group profile download (given by the ctxParams1) the subscription management entity checks that the LPA certificate (i.e. the virtual identity module certificate in the ASR structure) indicates that the LPA is certified for group profile download. The subscription management entity also verifies that there is a group profile download prepared corresponding to the MatchingID provided in the ctxParams1.

13. If successful authentication, the subscription management entity prepares a standard response containing profile metadata, subscription management entity signature and subscription management entity certificate for profile binding. This data is then sent to the LPA as a response to the AuthenticateClient command.

14. The LPA verifies the received response by performing verification as commonly performed by the LPAd and the identity module according to the GSMA RSP standard. If successful verification, the LPA then generates a Prepare-DownloadResponse structure extended for group profile download. This structure is signed by the LPA and in case of group profile download contains the identity module certificate of each identity module in the batch of identity modules.

15. The LPA sends the GetBoundProfilePackage command containing the PrepareDownloadResponse structure to the subscription management entity.

16. The subscription management entity verifies the PrepareDownloadResponse according to standard GSMA RSP verification. The subscription management entity then also verifies all the identity module certificates included in the PrepareDownloadResponse structure. The LPA certificate and all identity module certificates use the same EC parameters. If successful verification, the subscription management entity prepares a BoundProfilePackage (BPP) for each identity module in the batch of identity modules, i.e. one BPP per identity module certificate in the PrepareDownloadResponse structure.

17. As a response to the GetBoundProfilePackage command the subscription management entity sends the prepared BPPs to the LPA.

18. (Optional) The LPA performs partial processing of each of the BPPs received in step 17. If any errors are encountered by the LPA a ProfileInstallationResult structure following the GSMA RSP standard is prepared indicating the type of error. This ProfileInstallationResult structure is sent to the subscription management entity using the HandleNotification command. If successful verification of all BPPs, they are stored in the LPA database, together with the subscription management entity certificate for profile binding and subscription management entity address previously obtained from the subscription management entity, for use at the profile installation described below.

The LPA certificate is formatted like a standard GSMA RSP identity module certificate with the difference that the certificate extension for Certificate Policies is different and indicates that group profile download is possible. The extension value for a normal identity module certificate is id-rspRole-identity module and a new value is defined for group profile download support.

The BPPs of the group profile download reuses the same structure as the standard GSMA RSP but with modifications to the values of the structure. First, there is no ephemeral EC public key from each of the identity modules of the communication devices. Hence, when deriving the ECDH shared secret the permanent EC public key of the identity module certificate is used instead. Second, for the LPA to be able to check which BPP belong to which communication device the transactionId of the BPP is set to the EID of the identity module of the communication device. The subscription management entity obtains the EID from the identity module certificate for use when constructing the BPP.

One particular embodiment for profile handling of a batch of identity modules, in particular relating to profile installation in an identity module of a batch of identity modules, based on at least some of the above disclosed embodiments will now be disclosed in detail.

In this embodiment the standard BoundProfilePackage (BPP) format is used but with the modifications in its construction according to what was described above for profile download. An identity module following the GSMA RSP standard is extended with a new ES10b function "ConfigureLoadBPPSettings" to put the identity module in the correct state for installation of a profile protected through the ordinary ES10b function LoadBoundProfilePackage. This state is something that in case of single profile installation is setup through the prior execution of the AuthenticateServer and PrepareDownload functions.

Figure 9:
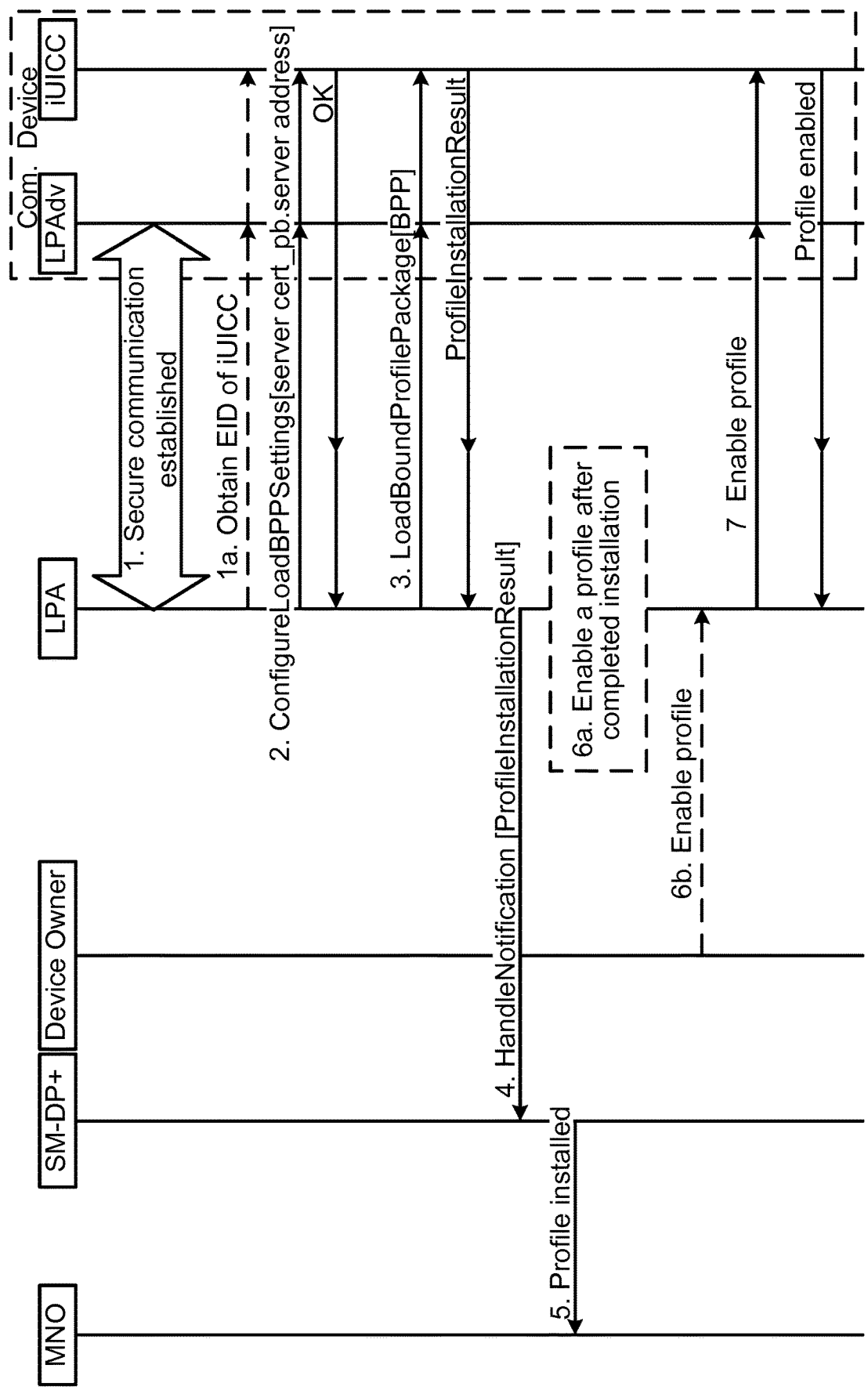

Reference is made to the signalling diagram of FIG. 9 for profile handling of a batch of identity modules, in particular relating to profile installation for an identity module.

1. Secure communication is established between the LPA and the communication device. Secure communication might be established using e.g. DTLS or the communication is secured by the communication device being in production mode or debug mode.

1a. (optional) The LPA sends a command to obtain the EID of the identity module, if the EID is not already known by the LPA from preconfigured information matching a communication device identifier obtained in step 1.

2. The LPA sends a command triggering the ConfigureLoadBPPSettings function of the identity module to prepare the identity module for installation of the BPP.

3. The LPA sends a command triggering the LoadBoundProfilePackage function. The correct BPP is located based on the EID of the identity module. The identity module processes the BPP according to GSMA RSP procedure to verify, decrypt, and install the profile. Upon successful or erroneous installation the identity module prepares and returns to the LPA a ProfileInstallationResult structure.

4. The LPA sends a HandleNotification command to the subscription management entity including the ProfileInstallationResult.

5. The subscription management entity processes the ProfileInstallationResult and forwards information to the MNO to indicate whether the profile was successfully installed or not.

6. The LPA is triggered to enable the profile. The LPA might be configured to always enable the profile upon successful profile installation. Alternatively the LPA is triggered from the outside (e.g. via the device owner) to enable the profile.

7. The LPA sends a command to the identity module triggering the EnableProfile function. This results in the profile being enabled. If the device communication is attached to a cellular network, then the communication device re-attaches to the cellular network according to the new active profile. In a manufacturing environment the communication device is typically not operatively connected to the network and this step needs then not to be performed.

The BPPs for group profile download are not bound to a specific session with the identity module and might therefore be re-installed into each communication device at a later point in time. In this respect, it is only the LPA that gets access to the BPPs since they are encrypted in the HTTPS session when sent to the LPA. To get the BPPs from the subscription management entity the LPA has to be a legitimate LPA as verified by the subscription management entity before providing the BPPs. Being a legitimate LPA means the LPA makes sure the BPPs are securely stored and not accessible to other entities and are deleted from storage upon successful installation. Furthermore, the communication device is protected against rogue profile management operations including profile installation by requiring some form of secure communication, including mutual authentication, to be established between the LPA and the communication device, or requiring the communication device to be in debug mode, before profile management operations can be performed. This means only authorized LPAs and/or manufacturing tools can trigger installation of BPPs.

The ES10b function ConfigureLoadBPPSettings might be used by the LPA to provide the subscription management entity certificate for profile binding and the subscription management entity address to the identity module. When this function is called the identity module might perform according to the following. The identity module verifies the subscription management entity certificate for profile binding. Upon successful verification the subscription management entity public key and subscription management entity OID (object identifier) are extracted. The identity module prepares its internal state to indicate successful execution of AuthenticateServer and PrepareDownload function and saves the following data to its internal state for use when LoadBoundProfilePackage function is called: subscription management entity public key, subscription management entity OID, subscription management entity address. The transactionId is set to the EID of the identity module, indicating that the permanent EC key pair is to be used instead of the ephemeral EC key pair in deriving the ECDH shared secret when processing the BPP.

A second particular embodiment for profile handling of a batch of identity modules based on at least some of the above disclosed embodiments will now be disclosed in detail.

In this embodiment a proprietary identity module with proprietary protected profile format and functions for profile installation is used. Either the MNO or the subscription management entity or both are assumed to be aware of the protected profile proprietary format and prepares the protected profiles for all the identity modules in the batch and makes them available to the subscription management entity for download, as linked to the MatchingID. The protection of the profile for a given communication device is based on the public key of the identity module of the given communication device, ensuring only the correct communication device is enabled to decrypt the protected profile. The profile download flow of the first particular embodiment still applies but, as will be disclosed in the next two examples, differs in how the BPP is constructed.

In the first example the UPP itself is the proprietary protected profile. The subscription management entity then constructs the BPP following the GSMA RSP standard where either session keys or random keys might be used in the protection of the PPP. In this example an ephemeral ECDH key pair is generated by the LPA where the public key is provided in the PrepareDownloadResponse structure and where the ephemeral key pair of the LPA is used in generating the session keys for protection of the BPP. In step 18 of FIG. 8 the LPA then verifies the BPP, derives the session keys, and decrypts and verifies the PPP to obtain the UPP which in fact is the proprietary protected profile. The LPA then uses proprietary functions and/or commands of the identity module for installation of the profile.

In the second example the PPP in the BPP is the proprietary protected profile. In this example the same type of processing is performed by the LPA as in the first example but there is neither any decryption nor any verification of the PPP performed in step 18 of FIG. 8. Authentication and integrity protection of the proprietary protection profile is obtained through the HTTPS session.

A third particular embodiment for profile handling of a batch of identity modules based on at least some of the above disclosed embodiments will now be disclosed in detail.

In this third particular embodiment the standard GSMA RSP consumer variant profile download and installation flow between the LPA and the subscription management entity is performed once per profile to be downloaded, with differences as will be disclosed next.

A set of profiles are prepared for a batch of identity modules by the MNO or subscription management entity. A group key is shared between the MNO or subscription management entity and the manufacturer of identity modules as part of the profile preparation phase. This sharing might be done in relation to the profile preparation phase or later and might involve the enterprise owning the communication devices as a middleman. The group key is used to protect each prepared profile, resulting in a particular format known to the MNO or subscription management entity and the identity module of each communication device. For example, the random keys used to encrypt and integrity protect the UPP when creating the PPP might be derived from the group key and the protected profile follows the standard GSMA RSP PPP format. Alternatively, the BPP format is used and the group key replaces the ECDH shared key derived during BPP processing at the identity module. As a third example, a proprietary format might be used. The group key, and an identifier of the group key, are provisioned to the identity module by the manufacturer during personalization of the communication device or the identity module. The group key is never available to the LPA. A group key may also be provided in the identity module in case a group of identity modules have been ordered and used in the communication devices. In this case the group key may have been provisioned by the manufacturer of the identity module. Either the MNO or subscription management entity or the manufacturer might have generated the group key.

The LPA is associated with a virtual identity module and configured to perform profile download and installation according to the standard GSMA RSP consumer variant. The LPA obtains a set of activation codes, one for each identity module in the batch. The LPA performs standard GSMA RSP profile download and installation flow once per identity module in the batch using one of the ACs. Each protected profile is treated as a UPP which is encrypted by the subscription management entity to form a PPP, and then a BPP, that is sent to the LPA. Hence, the profile is encrypted twice and from the subscription management entity profile download and installation phase it is transparent that the UPP is in fact already a protected profile and not according to the SIM alliance format as defined in the eUICC Technical Releases by the SIM alliance as accessible at https://simalliance.org/euicc/euicc-technical-releases/ (as available of 4 Sep. 2019)The LPA and its identity module download and install each profile, which essentially means that the original protected profile is obtained and can be stored for installation in a communication device at a later time.

Each identity module might be provided with a function to support loading of a protected profile according to a protected profile format. The LPA selects one of the downloaded protected profiles and triggers the function to install the selected protected profile. The identity module uses the group key to decrypt and verify the protected profile. In the event that the BPP format is used as protected profile format then the ordinary LoadBoundProfilePackage identity module function may be used to install the BPP. A function similar to ConfigureLoadBPPSettings may be needed to be called before to let the identity module know that the group key is used in the processing of the BPP. Alternatively, the state of the identity module determines when the group key is expected to be used in the processing.

The set of protected profiles are bound to the batch of identity modules, but the individual binding is not made until the LPA selects one protected profile for a given communication device or identity module. Hence, a notification is sent from the identity module via the LPA to the subscription management entity to notify which profile is to be installed in which communication device. Upon successful installation of a profile the identity module might return a ProfileInstallationResult to the LPA that the LPA may forward to the subscription management entity. The ProfileInstallationResult is signed by the identity module of the communication device and the LPA might provide the identity module certificate (and EUM certificate) such that the subscription management entity may verify that the profile was successfully installed into a legitimate identity module.

Figure 10:
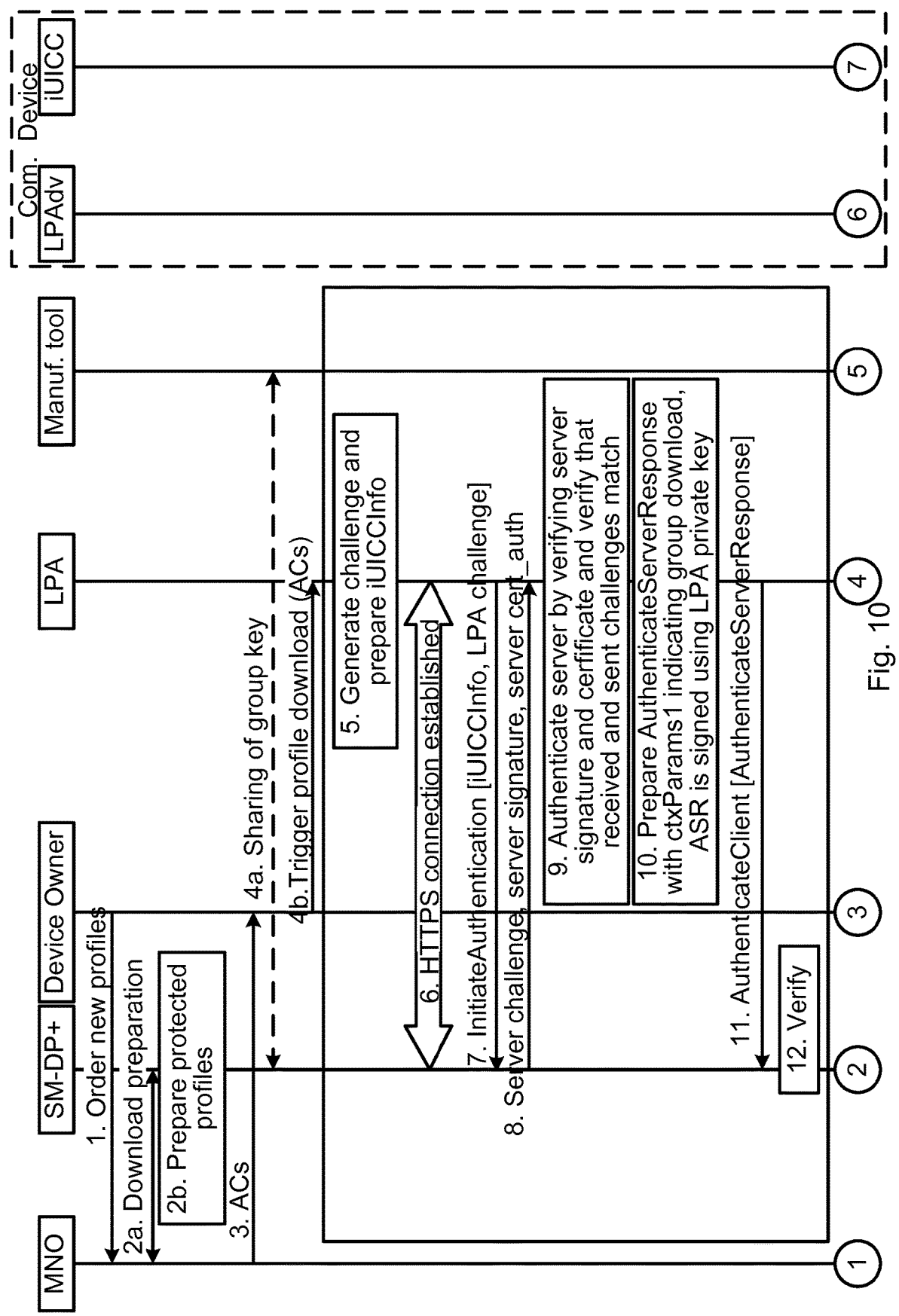
Figure 10:
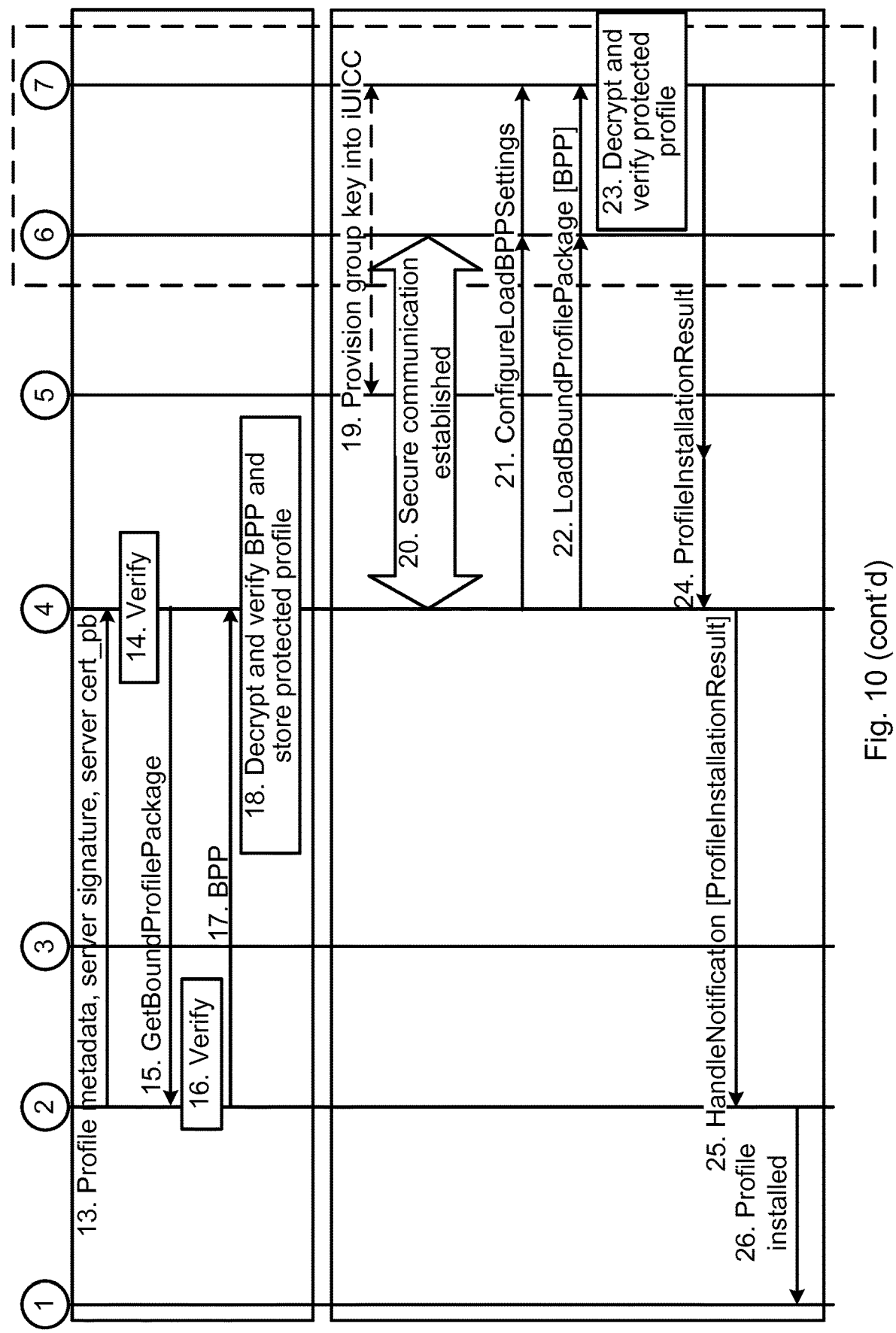

Reference is made to the signalling diagram of FIG. 10 for profile handling of a batch of identity modules, in particular relating to where one occurrence of the profile download and one occurrence of the profile installation is performed per identity module.

1. The device owner (as represented by the enterprise network 160) orders new profiles for the batch of identity modules. The enterprise network 160 indicates that group download will be performed.

2a, 2b. The MNO 520 and the subscription management entity 300 prepare subscription profiles for the batch of identity modules following standard procedures, but where the group key is involved to generate protected profiles. The format of the protected profiles is according to the BPP format according to what has been described above.

3. The device owner receives a set of activation codes (ACs), one for each identity module in the batch of identity modules, containing the subscription management entity address and a Matching ID identifying the profile download task.

4a, 4b. The manufacturing tool is configured with the group key. The device owner configures the LPA with the activation codes and triggers profile download.

Steps 5 to 18 are repeated for each identity module in the batch of identity modules:

5. The LPA generates a challenge and prepares an iUIC-CInfo1 structure. This is in contrast to common procedures where this structure is performed by the identity module.

6. The LPA then establishes an HTTPS connection with the subscription management entity following the GSMA RSP standard.

7. The LPA initiates mutual authentication with the subscription management entity by sending a standard Initiate-Authentication command to the subscription management entity, providing the LPA challenge and iUICCInfo1 to the subscription management entity.

8. The subscription management entity acts according to the GSMA RSP standard and responds with seryerSigned1 (containing LPA challenge, server challenge, etc.), serverSignature1 on serverSigned1 data, and subscription management entity certificate for authentication.

9. The LPA authenticates the subscription management entity by performing verification. This is in contrast to common procedures where this verification is performed by the LPAd and the identity module according to the GSMA RSP standard.

10. If successful authentication, the LPA prepares an AuthenticateServerResponse (ASR). The ASR is signed using the LPA private key (in contrast to the identity module private key used according to the GSMA RSP standard). The LPA certificate (in contrast to the identity module certificate used according to the GSMA RSP standard) indicates that the LPA is certified for group profile download.

11. The LPA sends the AuthenticateClient command containing the AuthenticateServerResponse structure to the subscription management entity.

12. The subscription management entity authenticates the LPA following the GSMA RSP standard. The subscription management entity checks that the LPA certificate (i.e. the virtual identity module certificate in the ASR structure) indicates that the LPA is certified for group profile download. The subscription management entity also verifies that there is a profile download prepared corresponding to the MatchingID provided in the ctxParams1.

13. If successful authentication, the subscription management entity prepares a standard response containing profile metadata, subscription management entity signature and subscription management entity certificate for profile binding. This data is then sent to the LPA as a response to the AuthenticateClient command.

14. The LPA verifies the received response by performing verification as commonly performed by the LPAd and the identity module according to the GSMA RSP standard. If successful verification, the LPA then generates a PrepareDownloadResponse structure. This structure is signed by the LPA.

15. The LPA sends the GetBoundProfilePackage command containing the PrepareDownloadResponse structure to the subscription management entity.

16. The subscription management entity verifies the PrepareDownloadResponse according to standard GSMA RSP verification. If successful verification, the subscription management entity prepares a BoundProfilePackage (BPP) based on one of the protected profiles prepared for the batch of identity modules. As described above, the protected profile (in BPP format protected using the group key) is here the UPP in creation of the BPP, where this outer BPP is protected using ephemeral keys from the subscription management entity and the virtual identity module according to standard GSMA RSP BPP generation.

17. As a response to the GetBoundProfilePackage command the subscription management entity sends the prepared BPP to the LPA.

18. The LPA performs partial processing of the received BPP in step 16. In particular, the LPA virtual identity module decrypts and verifies the outer BPP to obtain the protected profile (in BPP format protected using the group key). If any errors are encountered by the LPA a ProfileInstallationResult structure following the GSMA RSP standard is prepared indicating the type of error. This ProfileInstallationResult structure is sent to the subscription management entity using the HandleNotification command. If successful verification of the BPP, it is stored in the LPA database, together with the subscription management entity certificate for profile binding and subscription management entity address previously obtained from the subscription management entity, for use at the profile installation.

Steps 19 to 26 are repeated for each individual communication device:

19. The group key is provisioned into the identity module by the manufacturing tool.

20. Secure communication is established between the LPA and the communication device. Secure communication might be established using e.g. DTLS or the communication is secured by the communication device being in production mode or debug mode.

21. The LPA sends a command triggering the ConfigureLoadBPPSettings function of the identity module to prepare the identity module for installation of the BPP.

22. The LPA sends a command triggering the LoadBoundProfilePackage function. One BPP from the group of BPPs is selected.

23. The identity module processes the BPP according to GSMA RSP procedure to verify, decrypt, and install the profile, but where the group key replaces the ECDH shared key.

24. Upon successful or erroneous installation, the identity module prepares and returns to the LPA a ProfileInstallationResult structure.

25. The LPA sends a HandleNotification command to the subscription management entity including the ProfileInstallationResult.

26. The subscription management entity processes the ProfileInstallationResult and forwards information to the MNO to indicate whether the profile was successfully installed or not.

In summary, according to at least some of the herein disclosed embodiments there has been presented mechanisms for profile handling of a batch of identity modules according to which the standard GSMA RSP consumer profile is extended to handle separate profile download and profile installation of one or more identity modules. As there is not any online interaction between the subscription management entity and the identity module, neither during profile download nor during profile installation, the profile download and the profile installation can be performed at separate instances. At least some of the herein disclosed embodiments are based on the LPA acting as a virtual identity module for group download and thereby performs the roles of both the LPAd and the identity module. For this purpose, the LPA might have a special certificate, similar to an identity module certificate, for group profile download. The certificate is issued by an EUM similar to an identity module certificate and allows the LPApr/LA to authenticate to the subscription management entity similar to an ordinary identity module and indicate group profile download. The PrepareDownloadResponse structure sent in the LoadBoundProfilePackage command from the LPApr/LA to the subscription management entity is then extended to, in case of group download, contain the identity module certificate of each communication device for which a profile is requested. In response to this message a list of protected profiles is returned instead of only one protected profile as in the standard case.

FIG. 11 schematically illustrates, in terms of a number of functional units, the components of an LPA 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1710a (as in FIG. 17), e.g. in the form of a storage medium 230. The processing circuitry 210 may further be provided as at least one application specific integrated circuit (ASIC), or field programmable gate array (FPGA).

Particularly, the processing circuitry 210 is configured to cause the LPA 200 to perform a set of operations, or steps, as disclosed above. For example, the storage medium 230 may store the set of operations, and the processing circuitry 210 may be configured to retrieve the set of operations from the storage medium 230 to cause the LPA 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

Figure 1:
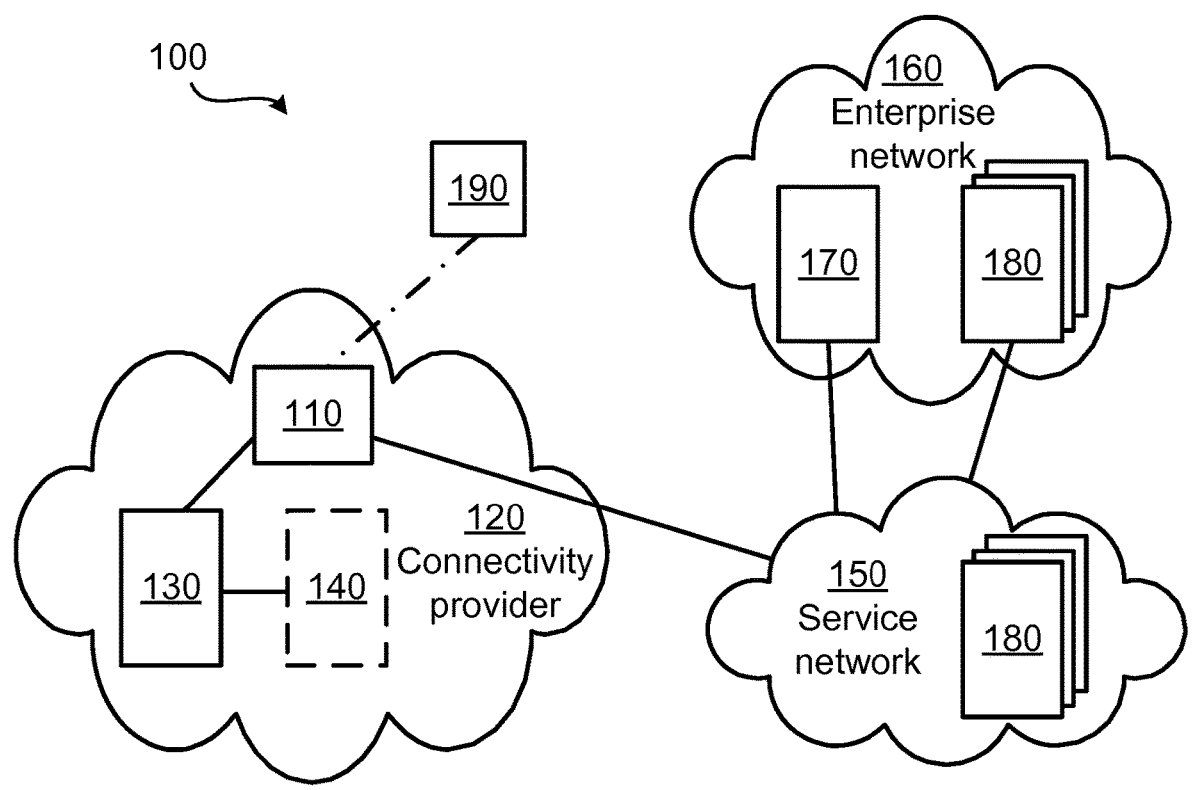
FIG. 1 is a schematic diagram illustrating a communication network according to embodiments.
Figure 2:
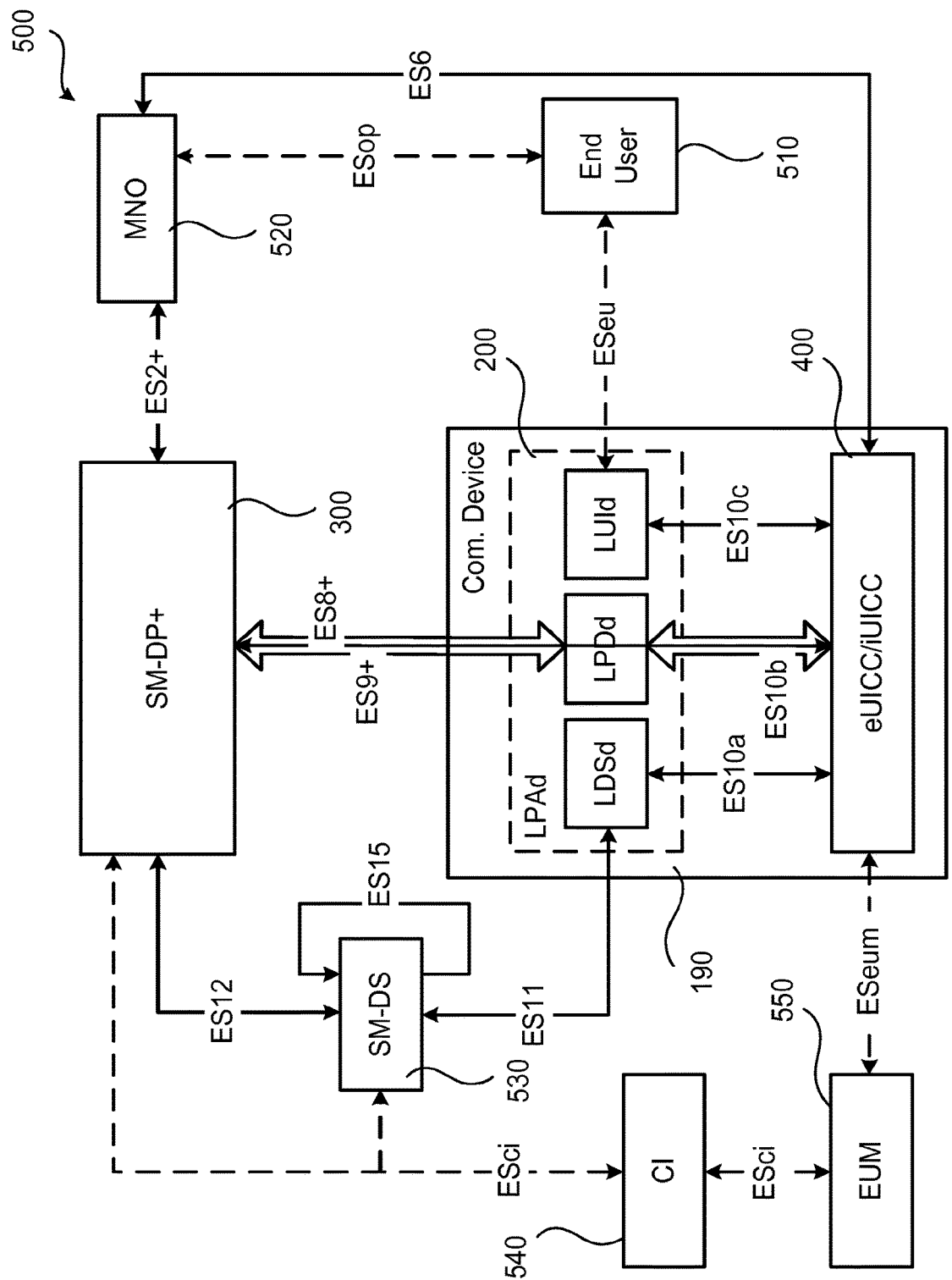
FIGS. 2 and 4 are schematic illustrations of architectures for connectivity management.
Figure 3:
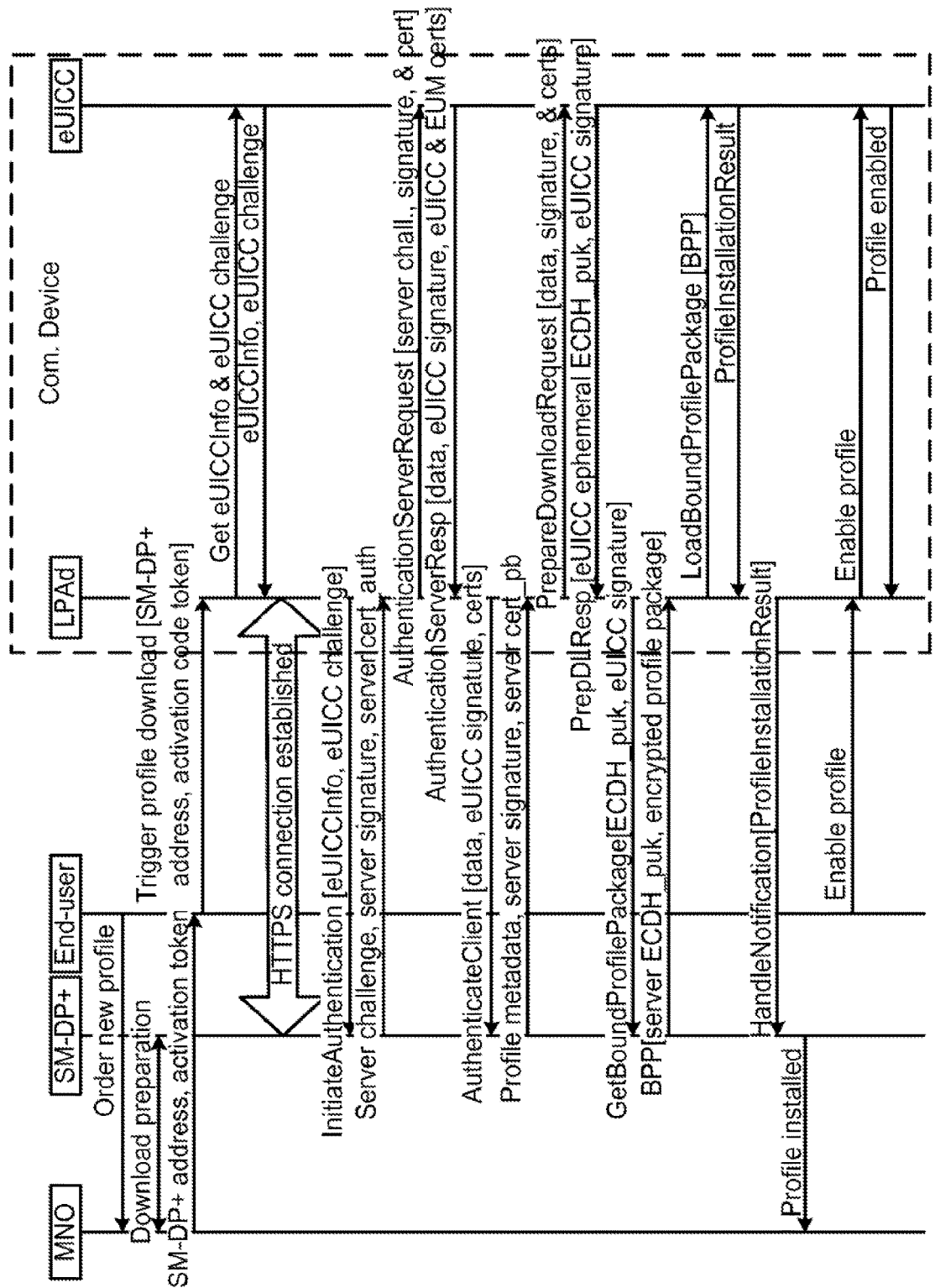
FIG. 3 is a signalling diagram.
Figure 4:
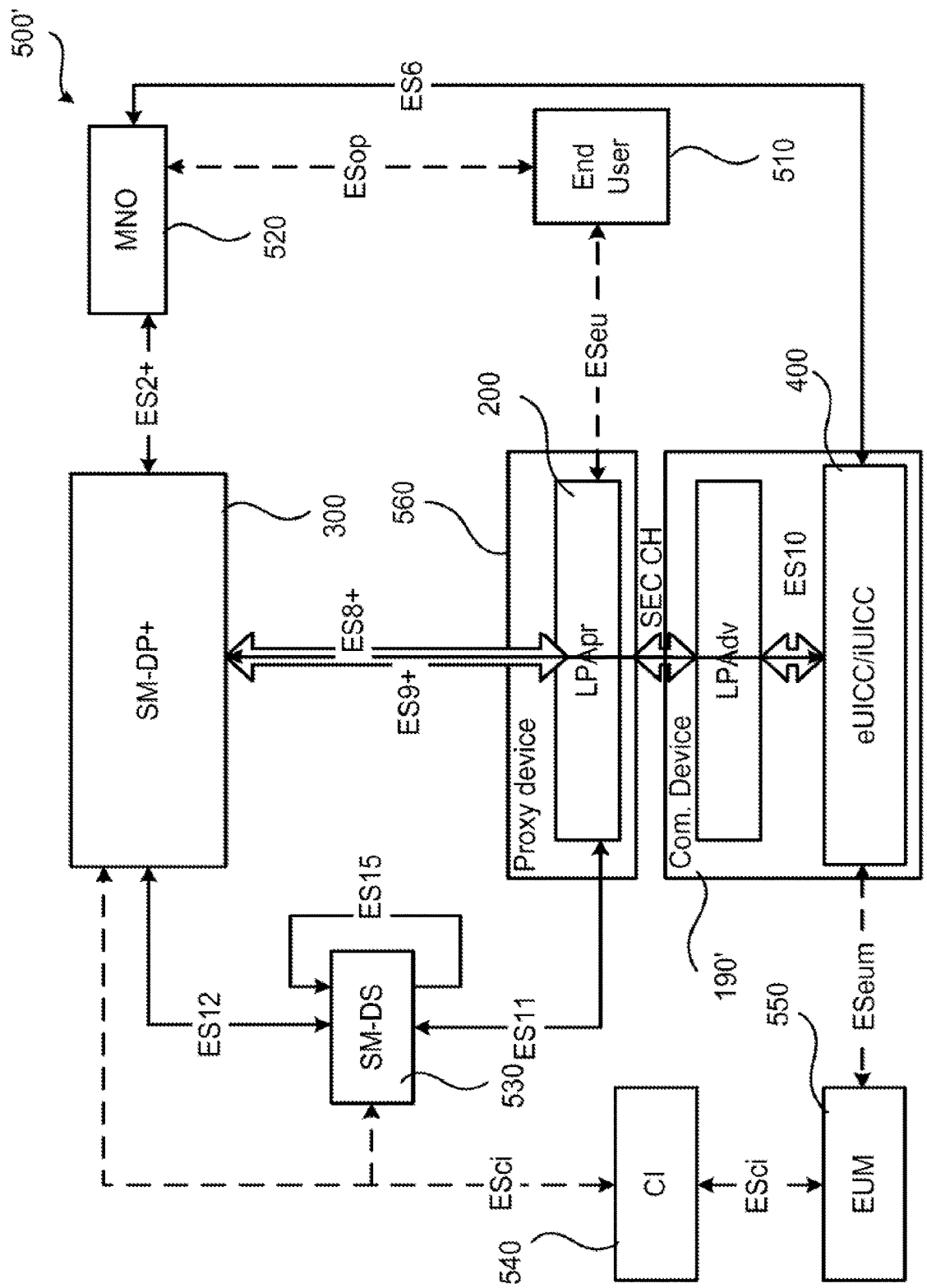

The LPA 200 may further comprise a communications interface 220 for communications with other entities, functions, nodes, and devices, as in FIG. 4. As such the communications interface 220 may comprise one or more transmitters and receivers, comprising analogue and digital components.

The processing circuitry 210 controls the general operation of the LPA 200 e.g. by sending data and control signals to the communications interface 220 and the storage medium 230, by receiving data and reports from the communications interface 220, and by retrieving data and instructions from the storage medium 230. Other components, as well as the related functionality, of the LPA 200 are omitted in order not to obscure the concepts presented herein.

FIG. 12 schematically illustrates, in terms of a number of functional modules, the components of an LPA 200 according to an embodiment. The LPA 200 of FIG. 12 comprises a number of functional modules; an authentication module 210a configured to perform step S102, a download module 210b configured to perform step S104, an install module 210 configured to perform step 5110, and a provide module 210f configured to perform step S112. The LPA 200 of FIG. 12 may further comprise a number of optional functional modules, such as any of a retrieve module 210c configured to perform step S106, and a provide module 210d configured to perform step S108. In general terms, each functional module 210a-210f may be implemented in hardware or in software. Preferably, one or more or all functional modules 210a-210f may be implemented by the processing circuitry 210, possibly in cooperation with the communications interface 220 and the storage medium 230. The processing circuitry 210 may thus be arranged to from the storage medium 230 fetch instructions as provided by a functional module 210a-210f and to execute these instructions, thereby performing any steps of the LPA 200 as disclosed herein.

FIG. 13 schematically illustrates, in terms of a number of functional units, the components of a subscription management entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1710b (as in FIG. 17), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscription management entity 300 to perform a set of operations, or steps, as disclosed above. For example, the storage medium 330 may store the set of operations, and the processing circuitry 310 may be configured to retrieve the set of operations from the storage medium 330 to cause the subscription management entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscription management entity 300 may further comprise a communications interface 320 for communications with other entities, functions, nodes, and devices, as in FIG. 4. As such the communications interface 320 may comprise one or more transmitters and receivers, comprising analogue and digital components.

The processing circuitry 310 controls the general operation of the subscription management entity 300 e.g. by sending data and control signals to the communications interface 320 and the storage medium 330, by receiving data and reports from the communications interface 320, and by retrieving data and instructions from the storage medium 330. Other components, as well as the related functionality, of the subscription management entity 300 are omitted in order not to obscure the concepts presented herein.

FIG. 14 schematically illustrates, in terms of a number of functional modules, the components of a subscription management entity 300 according to an embodiment. The subscription management entity 300 of FIG. 14 comprises a number of functional modules; an authentication module 310a configured to perform step S202, a download module 310c configured to perform step S206, and a receive module 310d configured to perform step S208. The subscription management entity 300 of FIG. 14 may further comprise a number of optional functional modules, such as any of a verify module 310b configured to perform step S204, and a store module 310e configured to perform step S210. In general terms, each functional module 310a-310e may be implemented in hardware or in software. Preferably, one or more or all functional modules 310a-310e may be implemented by the processing circuitry 310, possibly in cooperation with the communications interface 320 and the storage medium 330. The processing circuitry 310 may thus be arranged to from the storage medium 330 fetch instructions as provided by a functional module 310a-310e and to execute these instructions, thereby performing any steps of the subscription management entity 300 as disclosed herein.

There could be different examples of subscription management entities 300 and different ways to implement the subscription management entity 300. According to an embodiment, the subscription management entity 300 is an SM-DP+.

Figure 15:
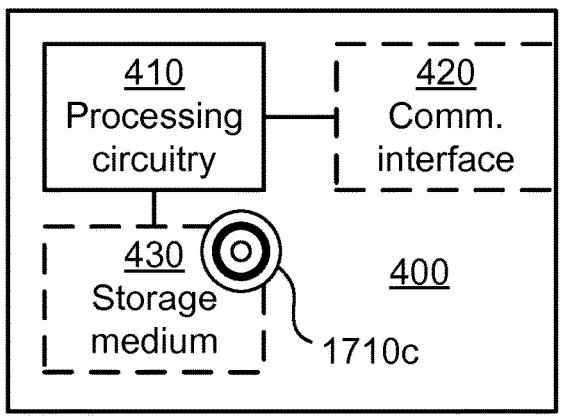
FIG. 15 is a schematic diagram showing functional units of an identity module according to an embodiment.

FIG. 15 schematically illustrates, in terms of a number of functional units, the components of an identity module 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1710c (as in FIG. 17), e.g. in the form of a storage medium 430. The processing circuitry 410 may further be provided as at least one application specific integrated circuit (ASIC), or field programmable gate array (FPGA).

Particularly, the processing circuitry 410 is configured to cause the identity module 400 to perform a set of operations, or steps, as disclosed above. For example, the storage medium 430 may store the set of operations, and the processing circuitry 410 may be configured to retrieve the set of operations from the storage medium 430 to cause the identity module 400 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The identity module 400 may further comprise a communications interface 420 for communications with other entities, functions, nodes, and devices, as in FIG. 4. As such the communications interface 420 may comprise one or more transmitters and receivers, comprising analogue and digital components.

The processing circuitry 410 controls the general operation of the identity module 400 e.g. by sending data and control signals to the communications interface 420 and the storage medium 430, by receiving data and reports from the communications interface 420, and by retrieving data and instructions from the storage medium 430. Other components, as well as the related functionality, of the identity module 400 are omitted in order not to obscure the concepts presented herein.

Figure 16:
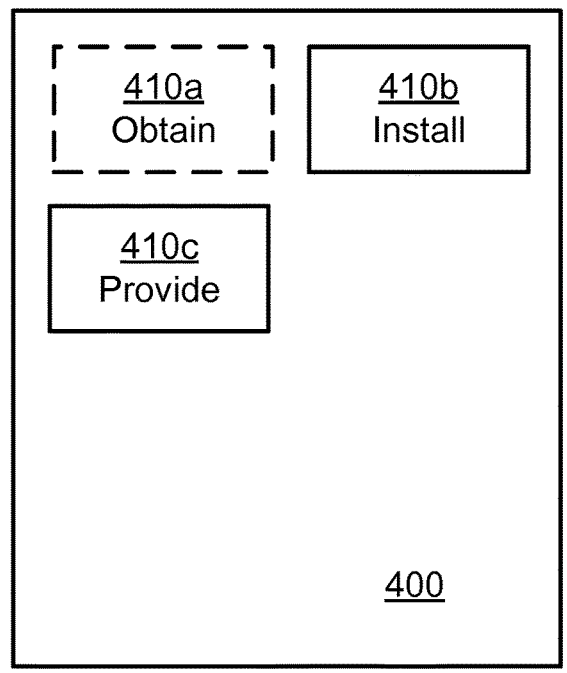
FIG. 16 is a schematic diagram showing functional modules of an identity module according to an embodiment.

FIG. 16 schematically illustrates, in terms of a number of functional modules, the components of an identity module 400 according to an embodiment. The identity module 400 of FIG. 16 comprises a number of functional modules; an install module 410b configured to perform step S304, and a provide module 410c configured to perform step S306. The identity module 400 of FIG. 16 may further comprise a number of optional functional modules, such as an obtain module 410a configured to perform step S302. In general terms, each functional module 410a-410c may be implemented in hardware or in software. Preferably, one or more or all functional modules 410a-410c may be implemented by the processing circuitry 410, possibly in cooperation with the communications interface 420 and the storage medium 430. The processing circuitry 410 may thus be arranged to from the storage medium 430 fetch instructions as provided by a functional module 410a-410c and to execute these instructions, thereby performing any steps of the identity module 400 as disclosed herein.

There could be different examples of identity modules 400 and different ways to implement the identity module 400. According to an embodiment, the identity module 400 is an iUICC or an eUICC.

Figure 17:
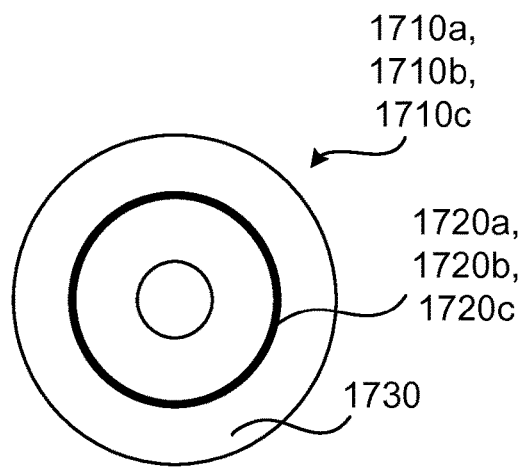
FIG. 17 shows one example of a computer program product comprising computer readable means according to an embodiment.

FIG. 17 shows one example of a computer program product 1710a, 1710b, 1710c comprising computer readable means 1730. On this computer readable means 1730, a computer program 1720a can be stored, which computer program 1720a can cause the processing circuitry 210 and thereto operatively coupled entities and devices, such as the communications interface 220 and the storage medium 230, to execute methods according to embodiments described herein. The computer program 1720a and/or computer program product 1710a may thus provide means for performing any steps of the LPA 200 as herein disclosed. On this computer readable means 1730, a computer program 1720b can be stored, which computer program 1720b can cause the processing circuitry 310 and thereto operatively coupled entities and devices, such as the communications interface 320 and the storage medium 330, to execute methods according to embodiments described herein. The computer program 1720b and/or computer program product 1710b may thus provide means for performing any steps of the subscription management entity 300 as herein disclosed. On this computer readable means 1730, a computer program 1720c can be stored, which computer program 1720c can cause the processing circuitry 410 and thereto operatively coupled entities and devices, such as the communications interface 420 and the storage medium 430, to execute methods according to embodiments described herein. The computer program 1720c and/or computer program product 1710c may thus provide means for performing any steps of the identity module 400 as herein disclosed.

In the example of FIG. 17, the computer program product 1710a, 1710b, 1710c is illustrated as an optical disc, such as a CD (compact disc) or a DVD (digital versatile disc) or a Blu-Ray disc. The computer program product 1710a, 1710b, 1710c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1720a, 1720b, 1720c is here schematically shown as a track on the depicted optical disk, the computer program 1720a, 1720b, 1720c can be stored in any way which is suitable for the computer program product 1710a, 1710b, 1710c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for profile handling of a batch of identity modules; wherein each identity module in the batch of identity modules has credentials for secure installation of profiles; the method being performed by a local profile assistant (LPA) of a proxy device; wherein the LPA comprises credentials for profile download; wherein the credentials comprise a certificate; wherein the credentials enable the LPA to act as a virtual identity module; the method comprising:

authenticating with a subscription management entity for group download of profiles for a batch of identity modules of respective communication devices to the LPA upon providing, in a GSMA Remote SIM Provisioning (RSP) AuthenticateClient command sent to the subscription management entity, the certificate of the virtual identity module and signed data; wherein the data is signed using the credentials of the virtual identity module; wherein the certificate and signed data is by the LPA used to authenticate itself to the subscription management entity on behalf of the batch of identity modules, and to identify the profiles for the batch of identity modules at the subscription management entity;

downloading, from the subscription management entity as a response to a GSMA RSP GetBoundProfilePackage command, profiles for the batch of identity modules; wherein each profile is protected by the subscription management entity, and thus defines a protected profile, such that it can be decrypted and verified by one of the identity modules in the batch of identity modules using its credentials for secure installation of protected profiles, but where the virtual identity module is without credentials for fully decrypting any of the protected profiles;

installing a respective one of the protected profiles to each of the identity modules in the batch of identity modules; and providing for each of the profiles, in a GSMA RSP HandleNotification command sent to the subscription management entity, a GSMA RSP ProfileInstallationResult with the result of the profile installation for the respective identity module.

2. The method of claim 1, further comprising retrieving, from each communication device, an identifier that enables the LPA to locate which protected profile to be installed into each identity module.

3. The method of claim 1:
wherein the credentials of the virtual identity module comprises a private key;
wherein the private key is used to sign the signed data of the AuthenticateClient command;
wherein the certificate of the virtual identity module comprises a virtual identity module identifier; and
wherein the profiles are identified at the subscription management entity either based on the virtual identity module identifier or a matching identifier that is part of the signed data.

4. The method of claim 1, further comprising providing an indication to each identity module to prepare for profile installation; wherein the indication comprises an address of the subscription management entity and a certificate of the subscription management entity.

5. The method of claim 1, wherein one single occurrence of the authenticating and one single occurrence of the downloading are performed for all the profiles.

6. The method of claim 1, wherein one respective occurrence of the authenticating and one respective occurrence of the downloading are performed for each of the profiles.

7. The method of claim 5:
wherein the certificate of the virtual identity module is a certificate for group download and the GSMA Remote SIM Provisioning AuthenticateClient command indicates group profile download;
wherein the credentials for secure installation of profiles of each identity module in the batch of identity module comprises an identity module private key and an identity module certificate; and
wherein downloading profiles from the subscription management entity for the batch of identity modules follows upon the certificate of each identity module in the batch of identity modules being provided to the subscription management entity; and
wherein the certificates are provided to the subscription management entity in a GSMA Remote SIM Provisioning GetBoundProfilePackage command.

8. The method of claim 7:
further comprising retrieving, from each communication device, an identifier that enables the LPA to locate which protected profile to be installed into each identity module;
wherein the identifier of each identity module is the EID of that identity module and the EID is part of the certificate of that identity module;
wherein which protected profile to be installed into which identity module is based on order of occurrence of the identity module certificates in the GSMA Remote SIM Provisioning GetBoundProfilePackage command being the same as order of occurrence of downloaded protected profiles listed in the response to the GSMA Remote SIM Provisioning GetBoundProfilePackage command.

9. The method of claim 7:
further comprising retrieving, from each communication device, an identifier that enables the LPA to locate which protected profile to be installed into each identity module;
wherein the identifier of each identity module is the EID of that identity module and the EID is part of the certificate of that identity module; and
wherein the protected profile for each identity module contains the EID, enabling the LPA to locate which protected profile to be installed into which identity module.

10. The method of claim 7, wherein the protected profile is a GSMA Remote SIM Provisioning formatted Bound Profile Package (BPP).

11. The method of claim 10:
wherein the BPP is encrypted using the public key of a respective identity module at a first encryption layer and an ephemeral elliptic curve (EC) public key of the virtual identity module at a second encryption layer;
wherein the second encryption layer is verified and decrypted by the virtual identity module using a corresponding ephemeral EC private key.

12. A method for profile handling of a batch of identity modules; wherein each identity module in the batch of identity modules has credentials for secure installation of profiles; the method comprising a subscription management entity:
authenticating a local profile assistant (LPA) of a proxy device for group download of profiles for a batch of identity modules of respective communication devices to the LPA upon obtaining, in a GSMA Remote SIM Provisioning (RSP) AuthenticateClient command sent from the LPA, a certificate and signed data for download of the profiles; wherein the subscription management entity, based on the certificate and signed data for download of the profiles, authenticates the LPA on behalf of the batch of identity modules and identifies profiles for the batch of identity modules;
downloading, to the LPA and as a response to the GSMA RSP GetBoundProfilePackage command, the profiles for the batch of identity modules; wherein each profile is protected, by the subscription management entity, and thus defines a protected profile such that it can be decrypted and verified by one of the identity modules in the batch of identity modules using its credentials for secure installation of profiles, but where the LPA is without credentials for fully decrypting any of the protected profiles; and
receiving, from the LPA and for each of the protected profiles, in a GSMA RSP HandleNotification command, a GSMA RSP ProfileInstallationResult with the result of the profile installation for the respective identity module.

13. The method of claim 12, wherein one single occurrence of the authenticating and one single occurrence of the downloading are performed for all the profiles.

14. The method of claim 13:
wherein the GSMA RSP AuthenticateClient command indicates group profile download;
wherein the method further comprises verifying that the certificate is certified for group profile download and that there exists a prepared group profile download matching an identity module identifier obtained from the certificate or a matching identifier obtained from the signed data.

15. The method of claim 13:
wherein each of the credentials for secure installation of profiles of each identity module in the batch of identity modules comprises an identity module private key and an identity module certificate;
wherein downloading profiles to the LPA for the batch of identity modules follows upon the certificate of each identity module in the batch of identity modules being received from the LPA; and
wherein the certificates are received from the LPA in the GSMA RSP GetBoundProfilePackage command.

16. The method of claim 15:
wherein each of the protected profiles is a GSMA Remote SIM Provisioning formatted BoundProfilePackage (BPP); and
wherein each BPP is protected using a permanent elliptic curve (EC) public key of its identity module as given by the respective certificate of the identity modules.

17. The method of claim 16:
wherein GSMA Remote SIM Provisioning session keys as used to protect individual parts of each BPP are derived from an Elliptic Curve Diffie-Hellman (ECDH) shared secret that is computed using a private key of an ephemeral EC key pair of the subscription management entity generated for each BPP and the permanent EC public key of the respective identity module; and
wherein a transaction identifier of each BPP acts as EID of the identity modules.

18. The method of claim 16:
wherein the protected profile is first protected using the permanent EC public key of the respective identity module;
wherein the thus resulting protected profile is used as input when generating the corresponding BPP such that the protected profile is encrypted twice;
wherein GSMA Remote SIM Provisioning session keys as used to protect individual parts of each BPP are derived from an Elliptic Curve Diffie-Hellman (ECDH) shared secret that is computed using a private key of an ephemeral EC key pair of the subscription management entity generated for each BPP and an ephemeral EC public key of a virtual identity module of the LPA.

19. A local profile assistant (LPA) of a proxy device for profile handling of a batch of identity modules; wherein each identity module in the batch of identity modules has credentials for secure installation of profiles; the LPA comprising:
credentials for profile download; wherein the credentials comprise a certificate;
wherein the credentials enable the LPA to act as a virtual identity module;
processing circuitry;
memory containing instructions executable by the processing circuitry whereby the LPA is operative to:
authenticate with a subscription management entity for group download of profiles for a batch of identity modules of respective communication devices to the LPA upon providing, in a GSMA Remote SIM Provisioning (RSP) AuthenticateClient command sent to the subscription management entity, the certificate of the virtual identity module and signed data; wherein the data is signed using the credentials of the virtual identity module; wherein the certificate and signed data is by the LPA used to authenticate itself to the subscription management entity on behalf of the batch of identity modules, and to identify the profiles for the batch of identity modules at the subscription management entity;
download, from the subscription management entity as a response to a GSMA RSP GetBoundProfilePackage command, profiles for the batch of identity modules; wherein each profile is protected by the subscription management entity, and thus defines a protected profile, such that it can be decrypted and verified by one of the identity modules in the batch of identity modules using its credentials for secure installation of protected profiles, but where the virtual identity module is without credentials for fully decrypting any of the protected profiles;
install a respective one of the protected profiles to each of the identity modules in the batch of identity modules; and
provide for each of the profiles, in a GSMA RSP HandleNotification command sent to the subscription management entity, a GSMA RSP ProfileInstallationResult with the result of the profile installation for the respective identity module.

20. A subscription management entity for profile handling of a batch of identity modules; wherein each identity module in the batch of identity modules has credentials for secure installation of profiles; the subscription management entity comprising:
processing circuitry;
memory containing instructions executable by the processing circuitry whereby the subscription management entity is operative to:
authenticate a local profile assistant (LPA) of a proxy device for group download of profiles for a batch of identity modules of respective communication devices to the LPA upon obtaining, in a GSMA Remote SIM Provisioning (RSP) AuthenticateClient command sent from the LPA, a certificate and signed data for download of the profiles; wherein the subscription management entity, based on the certificate and signed data for download of the profiles, authenticates the LPA on behalf of the batch of identity modules and identifies profiles for the batch of identity modules;
download, to the LPA and as a response to the GSMA RSP GetBoundProfilePackage command, the profiles for the batch of identity modules; wherein each profile is protected, by the subscription management entity, and thus defines a protected profile such that it can be decrypted and verified by one of the identity modules in the batch of identity modules using its credentials for secure installation of profiles, but where the LPA is without credentials for fully decrypting any of the protected profiles; and
receive, from the LPA and for each of the protected profiles, in a GSMA RSP HandleNotification command, a GSMA RSP ProfileInstallationResult with the result of the profile installation for the respective identity module.

\* \* \* \* \*